(12) United States Patent
Iguchi

(10) Patent No.: US 12,135,466 B2
(45) Date of Patent: Nov. 5, 2024

(54) ACTUATOR

(71) Applicant: Nidec Corporation, Kyoto (JP)

(72) Inventor: Takuro Iguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 600 days.

(21) Appl. No.: 17/407,252

(22) Filed: Aug. 20, 2021

(65) Prior Publication Data

US 2022/0066132 A1    Mar. 3, 2022

(30) Foreign Application Priority Data

Aug. 26, 2020  (JP) ................................ 2020-142967
Sep. 25, 2020  (JP) ................................ 2020-160362

(51) Int. Cl.
G02B 26/10  (2006.01)
G02B 7/182  (2021.01)
F16C 41/00  (2006.01)

(52) U.S. Cl.
CPC ......... G02B 7/1821 (2013.01); G02B 26/101 (2013.01); G02B 26/105 (2013.01); *F16C 41/007* (2013.01)

(58) Field of Classification Search
CPC .. G02B 7/1821; G02B 7/1822; G02B 7/1827; G02B 7/1828; G02B 7/181; G02B 26/101; G02B 26/105; G02B 26/10; G02B 26/0816; G02B 26/0833; G02B 26/085; F16C 41/007; F16C 11/02; F16C 2226/50; F16C 2370/20; F16C 2370/22; B81B 2201/04; B81B 2201/042; B81B 2201/045

See application file for complete search history.

(56) References Cited

U.S. PATENT DOCUMENTS 9,128,190 B1*  9/2015 Ulrich .................... G02B 26/08
2008/0310001 A1* 12/2008 Bernstein ........... G02B 26/0833
                                                         359/198.1
2014/0132091 A1   5/2014 Murata et al.

FOREIGN PATENT DOCUMENTS

CN    110487305 A    11/2019
JP    2005-300199 A  10/2005
WO    2018/138349 A2  8/2018

OTHER PUBLICATIONS

Kasuga, CN110487305, English language machine translation, generated Mar. 19, 2024 (Year: 2019).*

(Continued)

*Primary Examiner* — Stephone B Allen
*Assistant Examiner* — Adam W Booher
(74) *Attorney, Agent, or Firm* — Keating & Bennett, LLP

(57) ABSTRACT

An actuator includes a swing portion swingable about a first axis orthogonal to a central axis extending vertically and about a second axis orthogonal to the first axis and intersecting the central axis. An angle detector includes a pair of first angle detection elements above a non-magnetic structure and extending in the second axis direction with the first axis interposed therebetween when viewed from the central axis direction, and a pair of second angle detection elements extending in the first axis direction with the second axis interposed therebetween. Each of the first angle detection elements and each of the second angle detection elements include a columnar magnetic structure between the swing portion and the non-magnetic structure in the central axis direction, and a detection coil along the outer periphery of the magnetic structure.

20 Claims, 13 Drawing Sheets

(56) References Cited

OTHER PUBLICATIONS

Maeda, JP2005300199, English language machine translation, generated Mar. 20, 2024 (Year: 2005).*
Official Communication issued in corresponding Chinese Patent Application No. 202110979492.3, mailed on Apr. 20, 2023.

* cited by examiner

ACTUATOR

CROSS-REFERENCE TO RELATED APPLICATIONS

The present application claims priority under 35 U.S.C. § 119 to Japanese Patent Application No. 2020-142967, filed on Aug. 26, 2020 and Japanese Patent Application No. 2020-160362, filed on Sep. 25, 2020, the entire contents of which are hereby incorporated herein by reference.

1. FIELD OF THE INVENTION

The present disclosure relates to an actuator.

2. BACKGROUND

Conventionally, in a bearing-type optical scanning device that performs an operation of inclining a mirror on a first axis and a second axis, a method of detecting an inclination angle of the mirror by combining a photodiode and an LED is often adopted.

In a conventional optical scanning device, it is necessary to arrange a photodiode and an LED on a back surface of a mirror and reflect light by the mirror or a magnet, and it is difficult to miniaturize the device. In addition, since the usable temperature range of the photodiode, the LED, and the like is limited, it is difficult to use the photodiode, the LED, and the like in a place where the temperature change is large, a place where the temperature is high, and a place where the temperature is low, and even in a case where the photodiode, the LED, and the like can be used, the accuracy of angle detection may be lowered.

SUMMARY

An example embodiment of an actuator of the present disclosure includes a swing portion that is electrically conductive and is swingable about a first axis orthogonal to a central axis extending vertically and about a second axis orthogonal to the first axis and intersecting the central axis, a frame portion that supports the swing portion such that the swing portion is swingable about the first axis, a support portion that supports the frame portion such that the frame portion is swingable about the second axis, a magnet below the swing portion, a drive assembly including a drive coil on the support portion and defined by a lead wire wound around a stator core extending in the central axis direction, a non-magnetic structure between the swing portion and the drive coil in the central axis direction, and an angle detector to detect a swing angle of the swing portion. The angle detector includes a pair of first angle detection elements above the non-magnetic structure and extending in the second axis direction with the first axis interposed therebetween when viewed from the central axis direction, and a pair of second angle detection elements extending in the first axis direction with the second axis interposed therebetween, and each of the first angle detection elements and each of the second angle detection elements includes a columnar magnetic structure between the swing portion and the non-magnetic structure in the central axis direction, and a detection coil extending along an outer periphery of the magnetic structure.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the drawings. In the present specification, a central axis Cx, a first axis C1, and a second axis C2 are defined as follows. In an actuator 100 illustrated in FIG. 1, the central axis Cx extends vertically. In addition, the first axis C1 and the second axis C2 are orthogonal to each other. The central axis Cx intersects with each of the first axis C1 and the second axis C2 at intersections with the first axis C1 and the second axis C2. The second axis C2 is always orthogonal to the central axis Cx. In addition, the first axis C1 is orthogonal to the central axis Cx when a swing portion 1 is stopped. In addition, the top and bottom are defined along the central axis Cx with the actuator 100 illustrated in FIG. 1 as a reference. The name of each direction described above is used for the sake of explanation, and does not limit a positional relationship and a direction of the actuator 100 when in use.

Figure 1:
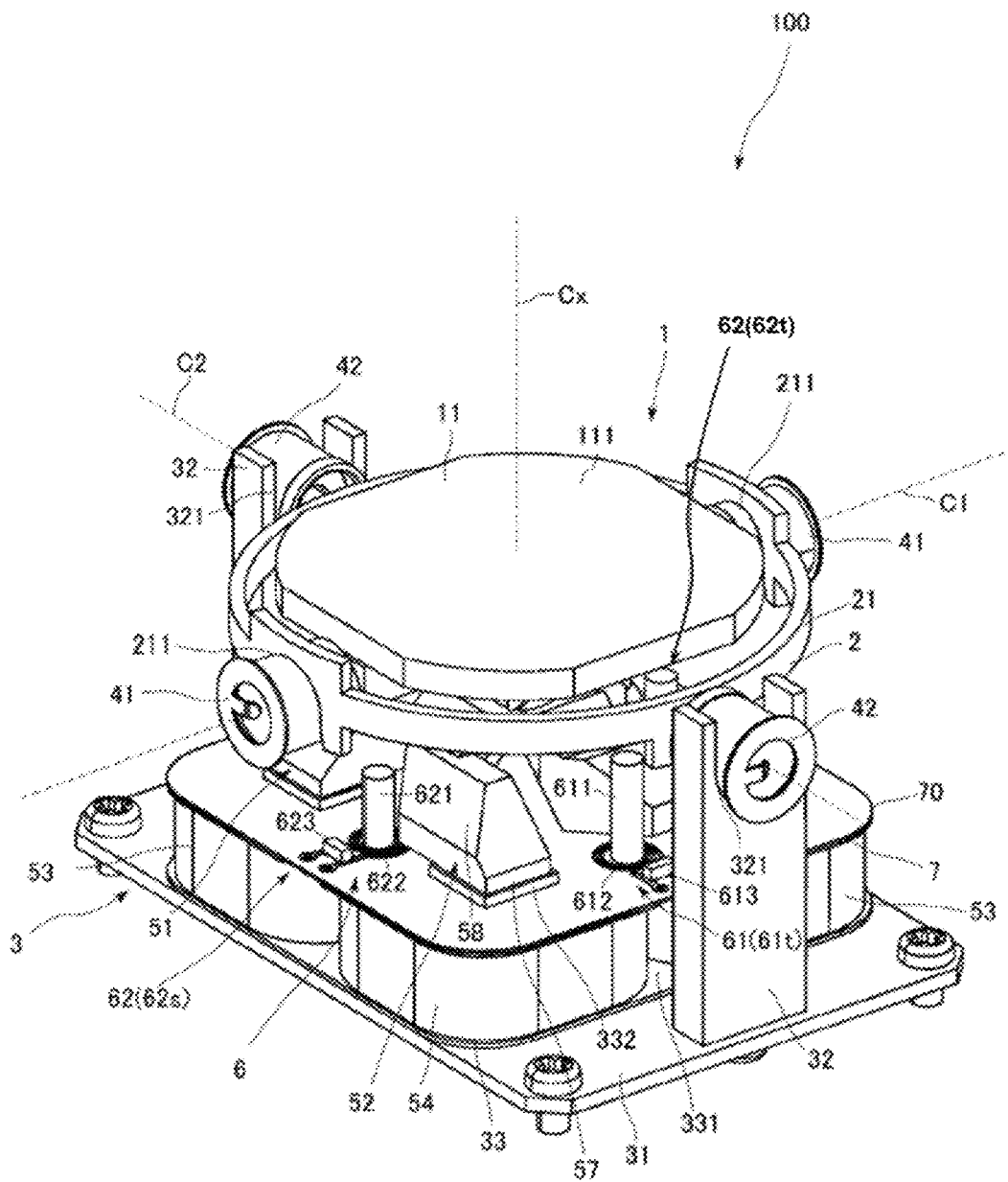
FIG. 1 is a perspective view of an optical scanning device that is a use example of an actuator according to an example embodiment of the present disclosure.
Figure 2:
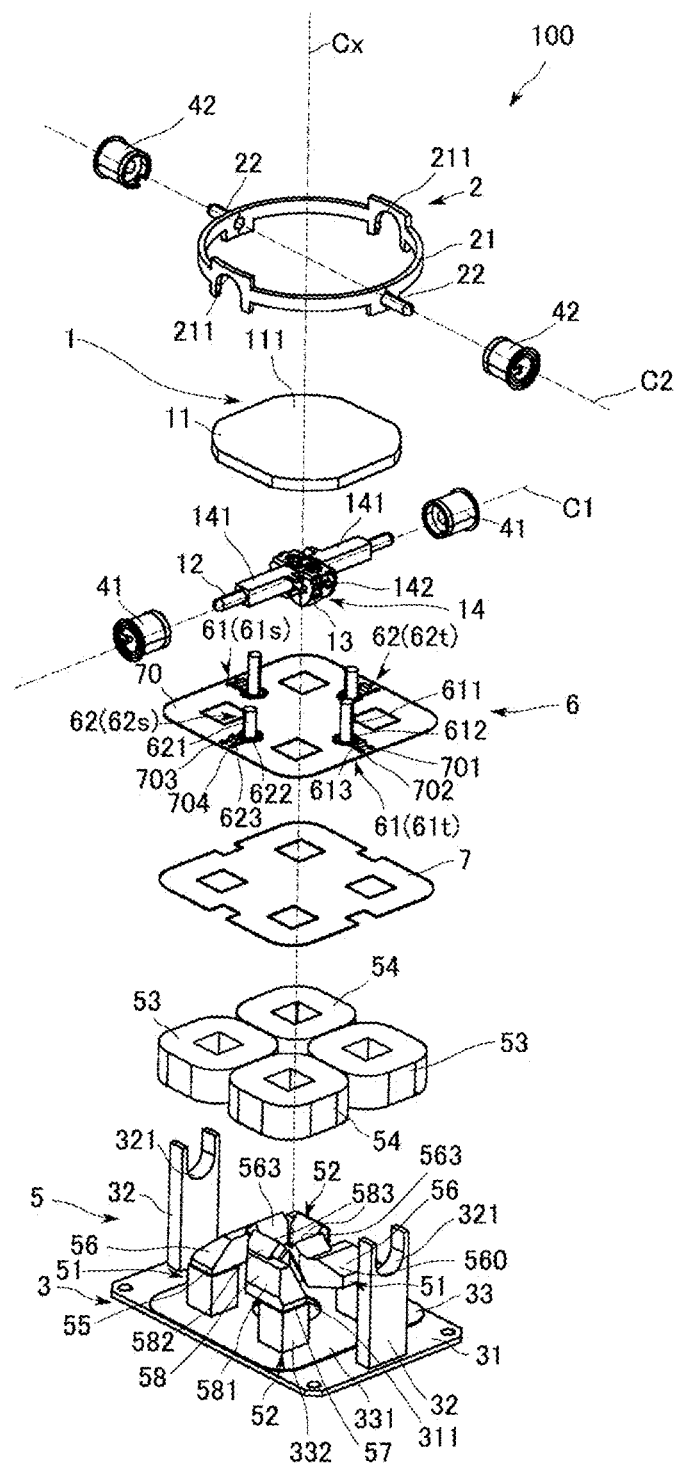
FIG. 2 is an exploded perspective view of the optical scanning device illustrated in FIG. 1.
Figure 3:
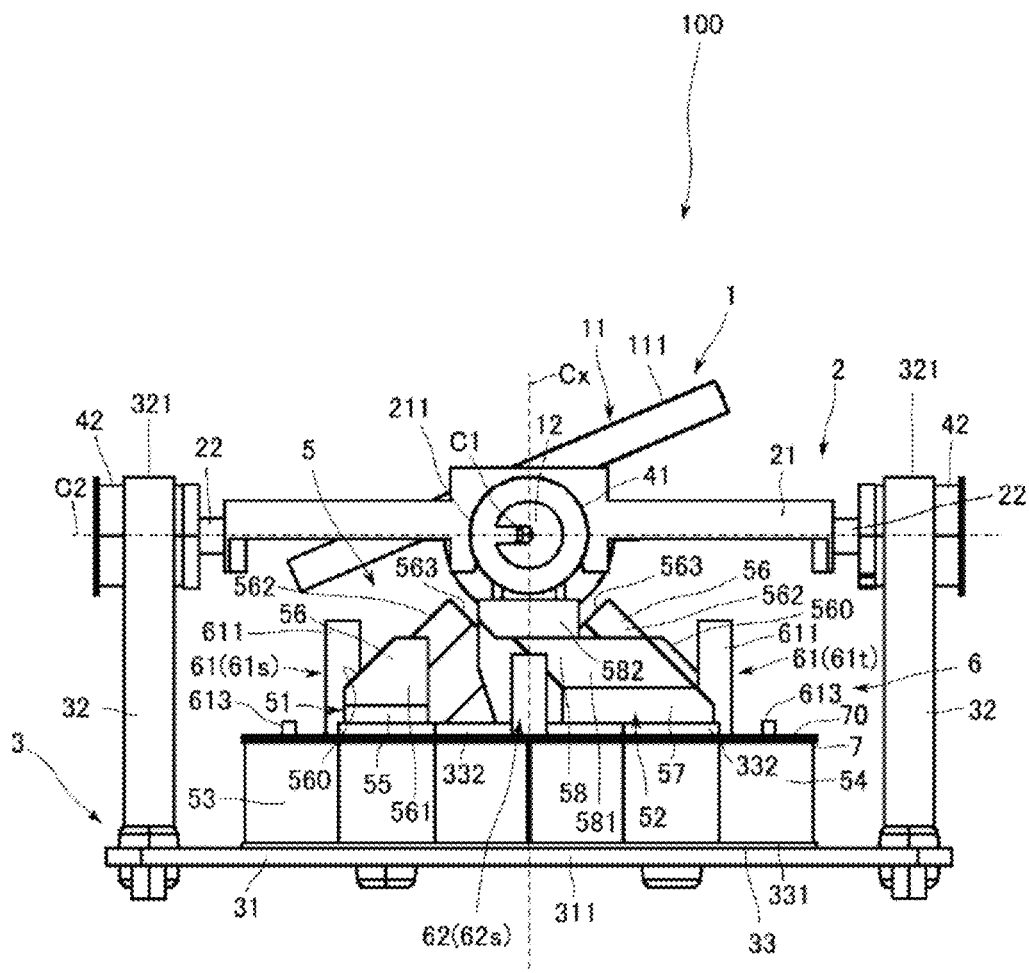
FIG. 3 is a front view of the actuator illustrated in FIG. 1 as viewed from a first axis direction.
Figure 4:
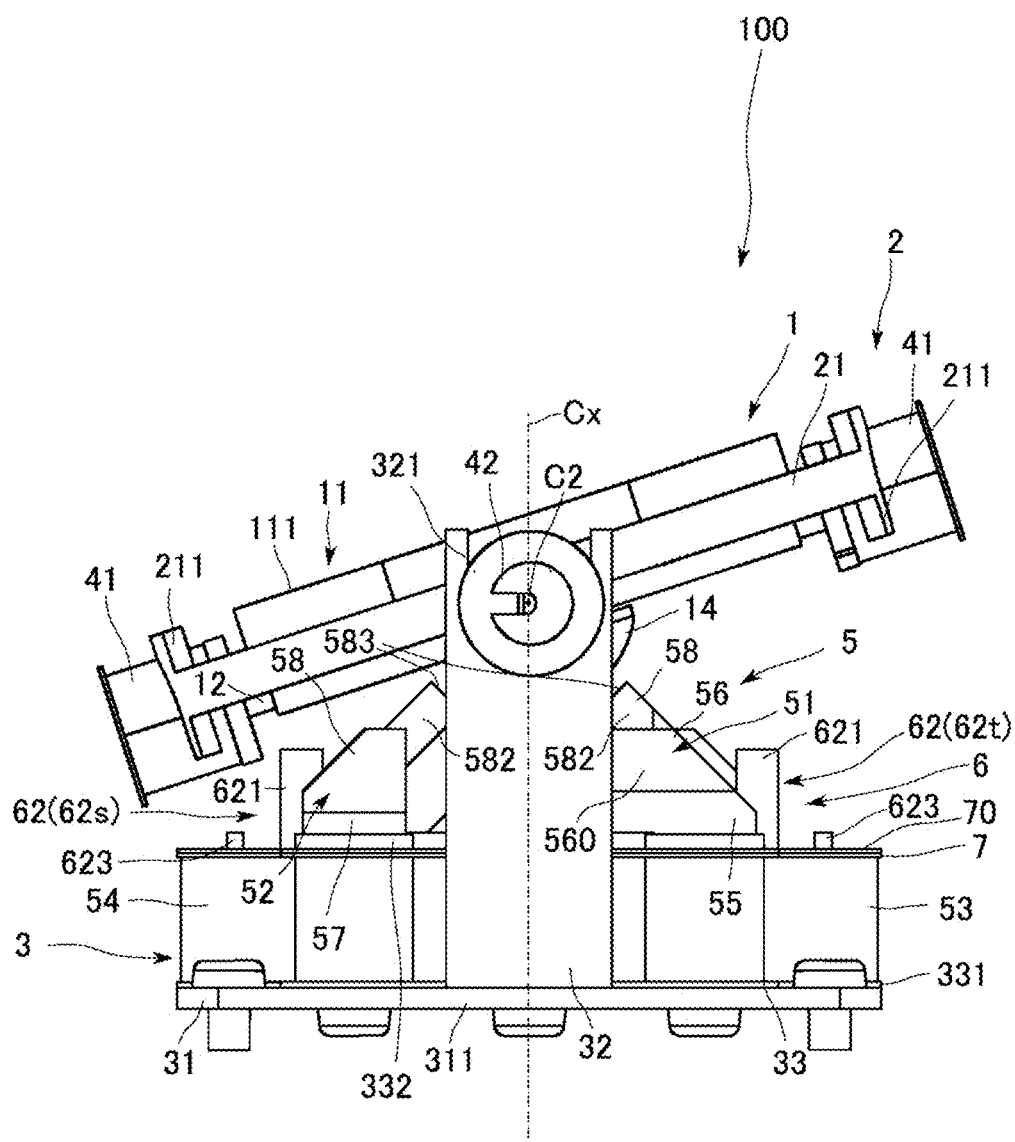
FIG. 4 is a side view of the actuator as viewed from a second axis direction.

FIG. 1 is a perspective view of the actuator 100 according to the present disclosure. FIG. 2 is an exploded perspective view of the actuator 100 illustrated in FIG. 1. FIG. 3 is a front view of the actuator 100 illustrated in FIG. 1 as viewed from the first axis C1 direction. FIG. 4 is a side view of the actuator 100 as viewed from the second axis C2 direction. In the actuator 100, the swing portion 1 has conductivity.

Then, the actuator 100 reflects light from a light source (not illustrated) on a reflecting surface 111 (to be described later) provided on a swing portion 1. The reflecting surface 111 reflects the light while swinging, thereby moving the reflected light and irradiating a wide range with the light, that is, scanning the light. As illustrated in FIGS. 1 to 4, the actuator 100 includes a swing portion 1, a frame portion 2, a support portion 3, a first bearing 41, a second bearing 42, a drive assembly 5, an angle detector 6, a non-magnetic structure 7, and a controller 8. Next, details of each unit of the actuator 100 will be described.

Figure 5:
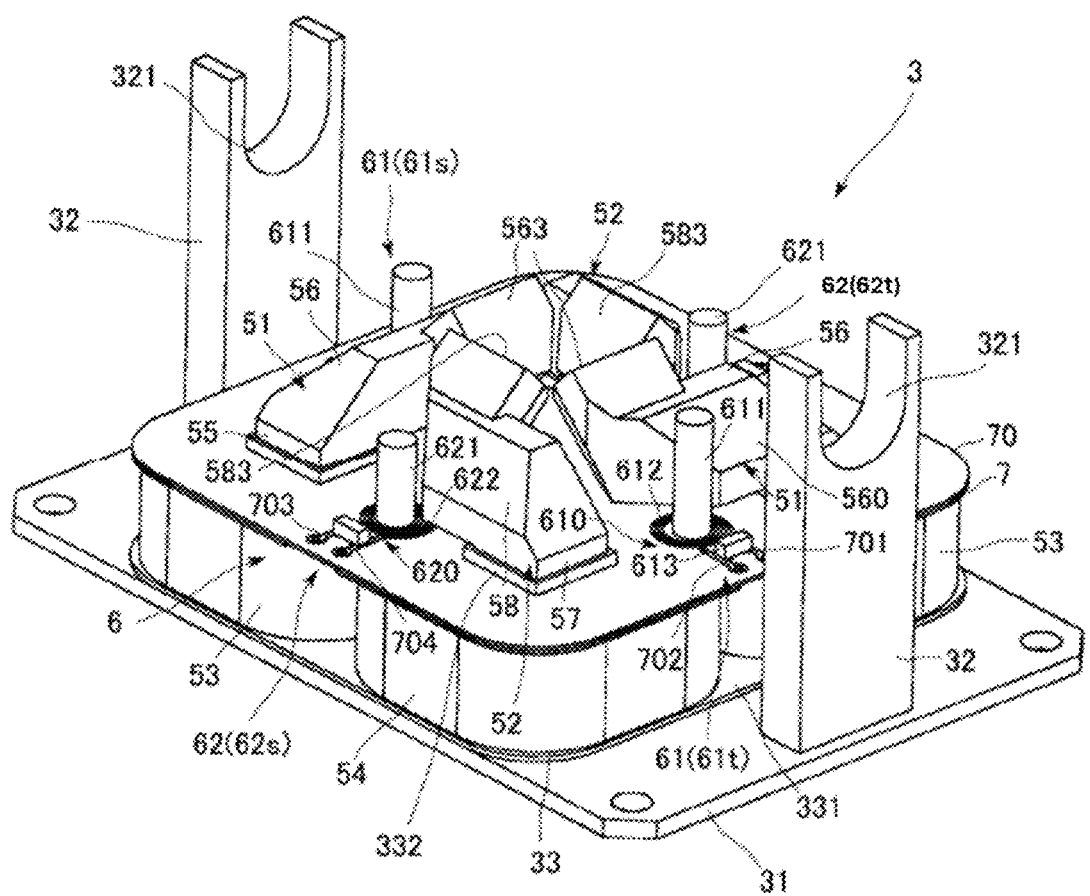
FIG. 5 is a perspective view of a support portion according to an example embodiment of the present disclosure.
Figure 6:
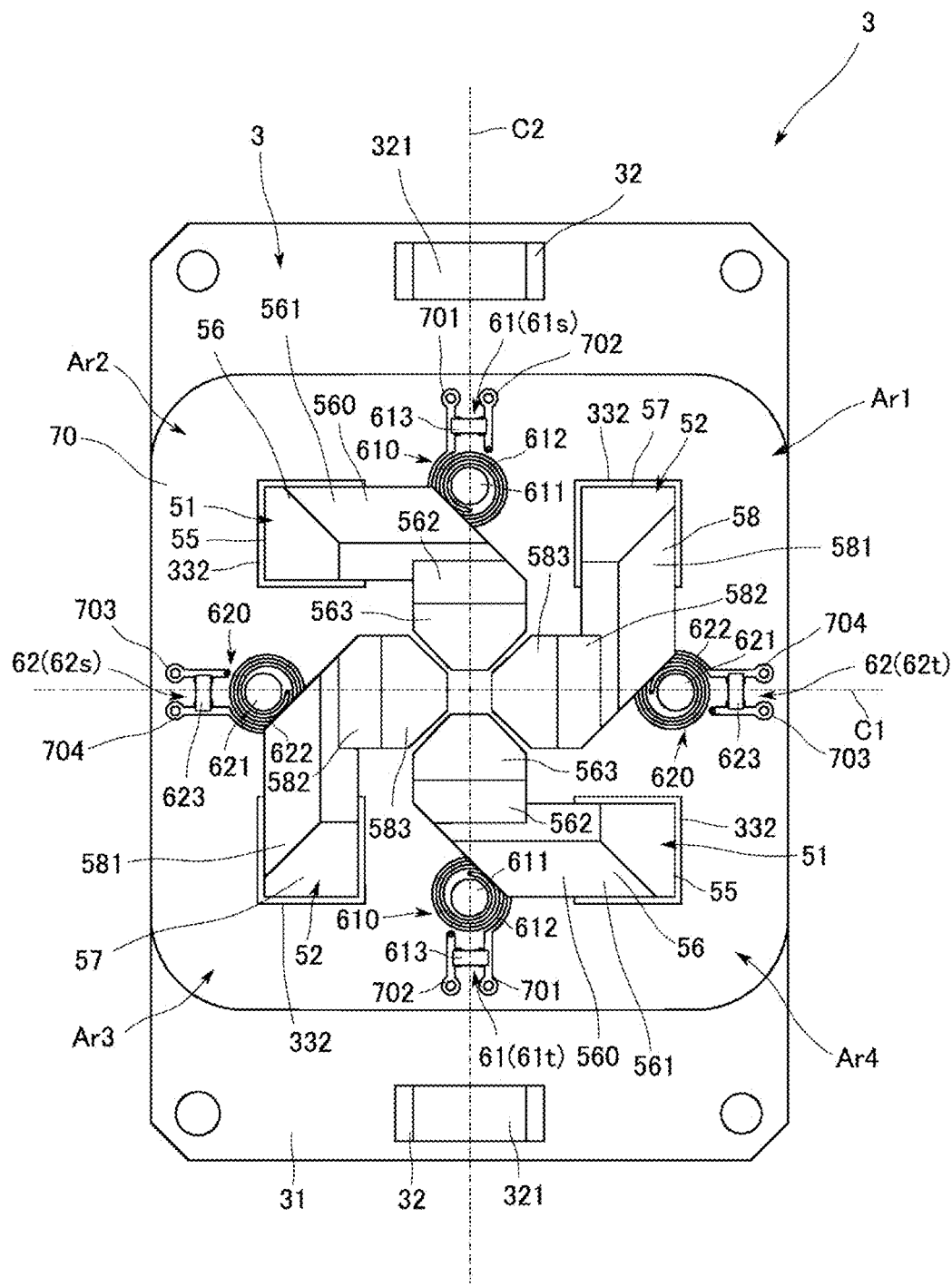
FIG. 6 is a plan view of the support portion.

FIG. 5 is a perspective view of the support portion 3. FIG. 6 is a plan view of the support portion 3. The support portion 3 is fixed to a mounting object such as an automobile and an unmanned aerial vehicle. As illustrated in FIGS. 1 to 6, the support portion 3 includes a base plate 31, a support arm 32, and an insulator 33.

As illustrated in FIGS. 5 and 6, the base plate 31 has a rectangular plate shape when viewed from the central axis Cx direction. As illustrated in FIGS. 2 to 4 and the like, the longitudinal direction of the base plate 31 is a direction along the second axis C2. The base plate 31 may be made of, for example, a magnetic material such as iron. The base plate 31 has a pedestal hole 311 penetrating along the central axis Cx at the center. The pedestal hole 311 is a hole through which lead wires of a first drive coil 53 and a second drive coil 54, which will be described later, of the drive assembly 5 pass.

Two support arms 32 are fixed to the upper surface of the base plate 31 with screws. The support arms 32 are arranged apart from each other in the direction of the second axis C2, and extend upward from the upper surface of the base plate 31 along the central axis Cx. The fixing of the support arm 32 to the base plate 31 is not limited to a screw, and a method capable of firmly fixing the support arm 32 to the base plate 31, such as welding or adhesion, can be widely adopted.

A concave second bearing holding portion 321, which penetrates in the direction of the second axis C2 and is open upward, is provided at an upper end of the support arm 32. The second bearing holding portion 321 holds the second bearing 42. The second bearing holding portion 321 supports the frame portion 2 swingably via the second bearing 42. That is, the support portion 3 supports the frame portion 2 so as to be swingable about the second axis C2 orthogonal to the first axis C1 and intersecting the central axis Cx.

The insulator 33 is made of an insulating material. The insulator 33 covers an outer side surface of each of a teeth portion 55 and a teeth portion 57 of the drive assembly 5. Then, the first drive coil 53 and the second drive coil 54 of the drive assembly 5 are formed by winding lead wires around the respective outer side surfaces of the teeth portion 55 and the teeth portion 57 covered by the insulator 33.

The insulator 33 insulates the lead wire from each of the teeth portions 55 and 57. In the support portion 3, the base plate 31 also has conductivity. Therefore, the insulator 33 is formed so as to be capable of being insulated from the base plate 31 as well. The insulator 33 includes a plate-shaped member 331 and a cylindrical member 332 formed of the same member (see FIG. 2). The plate-shaped member 331 is disposed on the upper surface of the base plate 31. The cylindrical member 332 protrudes from the plate-shaped member 331 in a direction along the central axis Cx, and each of the teeth portion 55 and the teeth portion 57 is accommodated. In the insulator 33, the plate-shaped member 331 and the cylindrical member 332 may be formed separately.

Next, details of the swing portion 1 will be described with reference to the drawings. The first axis C1 and the second axis C2 are orthogonal to each other and orthogonal to the central axis Cx. The swing portion 1 is arranged to be swingable about the first axis C1 and the second axis C2. As illustrated in FIG. 2, the swing portion 1 includes a flat plate portion 11, a shaft 12, a magnet 13, and a holder 14. The swing portion 1 is formed of, for example, a material having conductivity such as stainless steel or an aluminum alloy. By using a lightweight alloy such as an aluminum alloy as the swing portion 1, the amount of current consumption required for driving can be reduced.

The flat plate portion 11 has a plate shape whose square corner is formed into a curved surface as viewed in the direction of the central axis Cx. The flat plate portion 11 has the reflecting surface 111 on its upper surface. That is, the swing portion 1 has the flat plate portion 11 in which the reflecting surface 111 is formed on the upper surface.

The reflecting surface 111 reflects light emitted from a light source (not illustrated). The reflecting surface 111 is formed by mirror-finishing the upper surface of the flat plate portion 11. Note that the reflecting surface 111 is not limited to the one formed by mirror finishing. For example, a reflection layer that reflects light by treatment such as plating may be formed on at least a part of the upper surface of the flat plate portion 11. As the reflecting surface 111, configurations capable of reflecting light from the light source can be widely adopted.

The shaft 12 is a columnar member extending in the direction of the first axis C1. Both ends of the shaft 12 in the direction of the first axis C1 are swingably supported by the first bearing 41. The shaft 12 is fixed to the lower surface of the flat plate portion 11 via the holder 14.

The magnet 13 has a rectangular parallelepiped shape with a cross section. The magnet 13 has two pairs of parallel side surfaces. One of the pairs of side surfaces is arranged side by side in the direction of the second axis C2 and faces each of end surfaces 563 of an extending portion 56 of a first stator core 51 described later in the direction along the second axis C2 (see FIG. 3). The other pair of side surfaces is arranged side by side in the direction of the first axis C1 and faces each of end surfaces 583 of an extending portion 58 of a second stator core 52 to be described later in the direction along the first axis C1 (see FIG. 4).

Although the magnet 13 is a rectangular parallelepiped having a square cross section, the cross section may be a polygonal columnar shape such as an octagon as long as the magnet has a shape having parallel side surfaces arranged in the first axis C1 direction and parallel side surfaces arranged in the second axis C2 direction. In addition, the magnet 13 may have a shape that does not have the parallel pair of side surfaces, for example, a columnar shape or an elliptical columnar shape.

As illustrated in FIG. 2, the holder 14 is disposed on the lower surface of the flat plate portion 11. The holder 14 includes the shaft holding portion 141 and the magnet holding portion 142. The shaft holding portion 141 has a rectangular parallelepiped shape extending along the first axis C1, and the shaft 12 passes through the inside. The shaft 12 is fixed to the shaft holding portion 141. A portion of the shaft 12 protruding from the shaft holding portion 141 is swingably supported by the first bearing 41.

The magnet holding portion 142 holds the magnet 13. That is, the magnet 13 is arranged in the lower portion of the swing portion 1. The magnet holding portion 142 and the shaft holding portion 141 are fixed to each other. When viewed from the direction of the first axis C1, the magnet holding portion 142 has a shape in which the center protrudes downward and is curved. Accordingly, when the swing portion 1 swings about the first axis C1, it is possible to suppress interference between the magnet holding portion 142 and the end surface 563 of the extending portion 56 of the first stator core 51 disposed below.

The holder 14 is made of, for example, a magnetic material such as iron. Since the holder 14 is made of the magnetic material in this manner, the holder 14 also serves as a yoke. As a result, it is possible to enhance the utilization efficiency of magnetism of the magnet 13. The magnet 13 is fixed to the magnet holding portion 142 by a fixing method such as adhesion. However, the present disclosure is not limited thereto, and it is possible to widely adopt a fixing method capable of fixing with a strength capable of suppressing the movement of the magnet 13 at the time of swinging.

The holder 14 is fixed to the lower surface of the flat plate portion 11. Examples of a method for fixing the holder 14 include, but are not limited to, a method in which the holder is fixed to a protrusion protruding downward from the lower surface of the flat plate portion 11 by screwing. For example, it may be fixed to the lower surface of the flat plate portion 11 by adhesion, welding, or the like. A fixing method that can firmly fix the holder 14 to the lower surface of the flat plate portion 11 can be widely adopted.

As illustrated in FIGS. 1 and 2 and the like, the frame portion 2 has an annular portion 21 and the rotary protrusions 22. The annular portion 21 has a circular ring shape centered on the central axis Cx. The rotary protrusion 22 is a columnar shape that protrudes outward from the annular portion 21 in the direction of the second axis C2.

The rotary protrusion 22 is press-fitted and fixed in a through-hole provided in the annular portion 21. However, the disclosure is not limited thereto, and the annular portion 21 and the rotary protrusion 22 may be formed using the same member. Then, the rotary protrusion 22 is swingably supported by the second bearing holding portion 321 formed on the support arm 32 of the support portion 3 via the second bearing 42. The second bearing 42 may be a slide bearing or a rolling bearing such as a ball bearing. In addition, bearings other than these may be adopted.

The annular portion 21 has first bearing holding portions 211 at ends in the direction of the first axis C1. The first bearing holding portion 211 is a recess recessed upward from the lower surface of the annular portion 21. The first bearing 41 is held by the first bearing holding portion 211. The first bearing 41 is held by press-fitting in the first bearing holding portion 211, but is not limited thereto, and may be held by a fixing method such as adhesion or welding.

The shaft 12 of the swing portion 1 is swingably supported by the first bearing 41 held by the first bearing holding portion 211. Thus, the frame portion 2 supports the swing portion 1 so as to be swingable about the first axis C1 orthogonal to the central axis Cx extending vertically. Note that the first bearing 41 is a slide bearing, but is not limited thereto, and a ball bearing or the like may be adopted.

With the above configuration, the swing portion 1 is supported by the frame portion 2 via the first bearing 41 so as to be swingable about the first axis C1. In addition, the frame portion 2 is swingably supported about the second axis C2 via the second bearing 42. Thus, the swing portion 1 can swing around the first axis C1 and the second axis C2.

The drive assembly 5 is disposed on the upper surface of the base plate 31. The drive assembly 5 includes two first stator cores 51, two second stator cores 52, two first drive coils 53, and two second drive coils 54. That is, the drive assembly 5 includes stator cores (a first stator core 51 and a second stator core 52) disposed on the support portion 3 and extending in the central axis Cx direction.

In the support portion 3 illustrated in FIG. 6, a region corresponding to the first quadrant when the first axis C1 is the x-axis and the second axis C2 is the y-axis will be described as a first region Ar1. Similarly, a region corresponding to the second quadrant, a region corresponding to the third quadrant, and a region corresponding to the fourth quadrant will be described as a second region Ar2, a third region Ar3, and a fourth region Ar4, respectively.

In FIG. 6, the teeth portions 55 of the two first stator cores 51 are arranged in the second region Ar2 and the fourth region Ar4, respectively. The teeth portions 55 of the two first stator cores 51 are arranged at opposite positions with the central axis Cx interposed therebetween. In FIG. 6, the teeth portions 57 of the two second stator cores 52 are arranged in the first region Ar1 and the third region Ar3, respectively. The teeth portions 57 of the two second stator cores 52 are arranged at opposite positions with the central axis Cx interposed therebetween. The first stator core 51 and the second stator core 52 are arranged alternately in the circumferential direction.

The first stator core 51 and the second stator core 52 have the same configuration and shape. Therefore, in the present specification, the first stator core 51 will be described as a representative of the first stator core 51 and the second stator core 52, and the correspondence between the second stator core 52 and the first stator core 51 will be described.

The first stator core 51 is a molded body formed by sintering powder of a magnetic material such as iron powder as the same member, but is not limited thereto. For example, the first stator core 51 may be a stacked body in which magnetic plates are stacked. As illustrated in FIG. 2, the first stator core 51 has the teeth portion 55 and the extending portion 56.

The teeth portion 55 has a columnar shape. Here, a direction in which the teeth portion 55 extends is the direction along the central axis Cx. The teeth portion 55 illustrated in FIGS. 2, 5, and 6 has a rectangular parallelepiped shape, but is not limited thereto. For example, the teeth portion 55 may be a cylindrical column or a column having a polygonal cross-sectional shape other than a square such as a hexagon and an octagon.

The extending portion 56 extends from an upper end of the teeth portion 55 in the direction of the central axis Cx to one side in the circumferential direction about the central axis Cx. The extending portion 56 has a first arm portion 561 and a second arm portion 562. The first arm portion 561 of the extending portion 56 extends in the clockwise direction from the upper end of the teeth portion 55 in the circumferential direction about the central axis Cx. The first arm portion 561 is disposed in parallel with the base plate 31 and is orthogonal to the second axis C2 when viewed from the central axis Cx direction. The first arm portion 561 may not be parallel to the base plate 31. In addition, the first arm portion 561 may intersect with the second axis C2 at an angle other than the perpendicular as viewed in the central axis direction.

The second arm portion 562 extends upward from the free end of the first arm portion 561. The second arm portion 562 approaches the central axis Cx as proceeding upward in the direction of the central axis Cx. That is, the second arm portion 562 is inclined upward as proceeding toward the central axis Cx along the second axis C2. As a result, the second arm portion 562 extends in a direction away from the base plate 31 while approaching the central axis Cx. A surface of the second arm portion 562 close to the free end is the end surface 563. The end surface 563 is a surface that intersects with, specifically, a surface that is orthogonal to a direction in which the second arm portion 562 extends.

As viewed in the direction of the central axis Cx, the first arm portion 561 has an outer side surface 560 on a side opposite to the direction in which the second arm portion 562 extends. The outer side surface 560 is inclined in the same direction as the direction in which the second arm portion 562 extends. The end surfaces 563 of the two first stator cores 51 oppose each other in the direction of the second axis C2. In addition, each of the end surfaces 563 faces the magnet 13 arranged above (see FIG. 3 and the like). The first stator core 51 has the configuration described above.

The teeth portion 55 and the extending portion 56 of the first stator core 51 correspond to the teeth portion 57 and the extending portion 58 of the second stator core 52, respectively. In addition, the first arm portion 561, the second arm portion 562, and the end surface 563 of the extending portion 56 of the first stator core 51 correspond to a first arm portion 581, a second arm portion 582, and an end surface 583 of the extending portion 58 of the second stator core 52, respectively.

As illustrated in FIG. 6, the first arm portion 581 of the extending portion 58 of each second stator core 52 extends in the clockwise direction from the upper end of the teeth portion 57 in the circumferential direction about the central axis Cx. The first arm portion 581 is disposed in parallel with the base plate 31 and is orthogonal to the second axis C2 when viewed from the central axis Cx direction. The first arm portion 581 may not be parallel to the base plate 31. In addition, the first arm portion 581 may intersect with the first axis C1 at an angle other than the perpendicular as viewed in the central axis direction.

The second arm portion 582 extends upward from the free end of the first arm portion 581. The second arm portion 582 approaches the central axis Cx as proceeding upward in the direction of the central axis Cx. That is, the second arm portion 582 is inclined upward as proceeding toward the central axis Cx along the first axis C1. As a result, the second arm portion 582 extends in a direction away from the base plate 31 while approaching the central axis Cx. A surface of the second arm portion 582 close to the free end is the end surface 583.

In addition, the end surfaces 583 of the two second stator cores 52 oppose each other in the direction of the first axis C1. In addition, each of the end surfaces 583 faces the magnet 13 arranged above (see FIG. 4 and the like).

The teeth portion 55 of the first stator core 51 is fixed to the base plate 31 with screws, and the teeth portion 57 of the second stator core 52 is fixed to the base plate 31 with screws (see FIGS. 3, 4, and the like). Note that fixing of the teeth portion 55 and the teeth portion 57 is not limited to the screw, and welding, adhesion, or the like may be adopted.

The first drive coil 53 and the second drive coil 54 are formed by winding a lead wire around the teeth portion 55 and the teeth portion 57 with the insulator 33 interposed therebetween. That is, the drive coil 53 (54) of the drive assembly 5 is formed by winding a lead wire around the stator core 51 (52).

The lead wire wound around each of the teeth portion 55 and the teeth portion 57 is wired below the base plate 31 through the pedestal hole 311 of the base plate 31. The lead wire is connected to a control circuit such as a driver circuit (not illustrated). That is, an electromagnet is formed by forming the first drive coil 53 and the second drive coil 54 in the teeth portion 55 of the first stator core 51 and the teeth portion 57 of the second stator core 52, respectively. When a current is applied to each of the first drive coil 53 and the second drive coil 54, the end surface 563 and the end surface 583 serve as magnetic pole surfaces, respectively.

As illustrated in FIGS. 1, 2, and the like, when viewed from the central axis Cx direction, the first drive coil 53 and the second drive coil 54 of the drive assembly 5 are arranged side by side in the circumferential direction around the central axis Cx on the base plate 31. The region where the first drive coil 53 and the second drive coil 54 are arranged has a rectangular shape when viewed from the central axis Cx direction.

The non-magnetic structure 7 is a rectangular flat plate as viewed from the central axis Cx direction, and is formed of a material having a low magnetic permeability such as brass or an aluminum alloy. The non-magnetic structure 7 is disposed above the first drive coil 53 and the second drive coil 54. That is, the non-magnetic structure 7 is disposed between the swing portion 1 and the drive coil 53 (54) in the central axis Cx direction.

A wiring substrate 70 (see FIG. 2) is disposed on the upper surface of the non-magnetic structure 7. That is, the wiring substrate 70 is disposed between the non-magnetic structure 7 and the swing portion 1 in the central axis Cx direction. By disposing the wiring substrate 70 on the non-magnetic structure 7, it is possible to suppress the influence of the magnetic flux of the first drive coil 53 and the second drive coil 54 on the wiring substrate 70 and the electronic components mounted on the wiring substrate 70. By using the non-magnetic structure 7, it is possible to suppress the influence of the magnetic flux from the first drive coil 53 and the second drive coil 54 with respect to the angle detector 6 arranged on the wiring substrate 70.

Note that the non-magnetic structure 7 may have a shape outside the outer edges of the first drive coil 53 and the second drive coil 54 when viewed from the central axis Cx direction. That is, the first drive coil 53 and the second drive coil 54 are disposed inside the outer edge of the non-magnetic structure 7 when viewed from the central axis Cx direction. As a result, it is possible to suppress the magnetic flux leaking upward while bypassing the outer edge of the non-magnetic structure 7.

Figure 7:
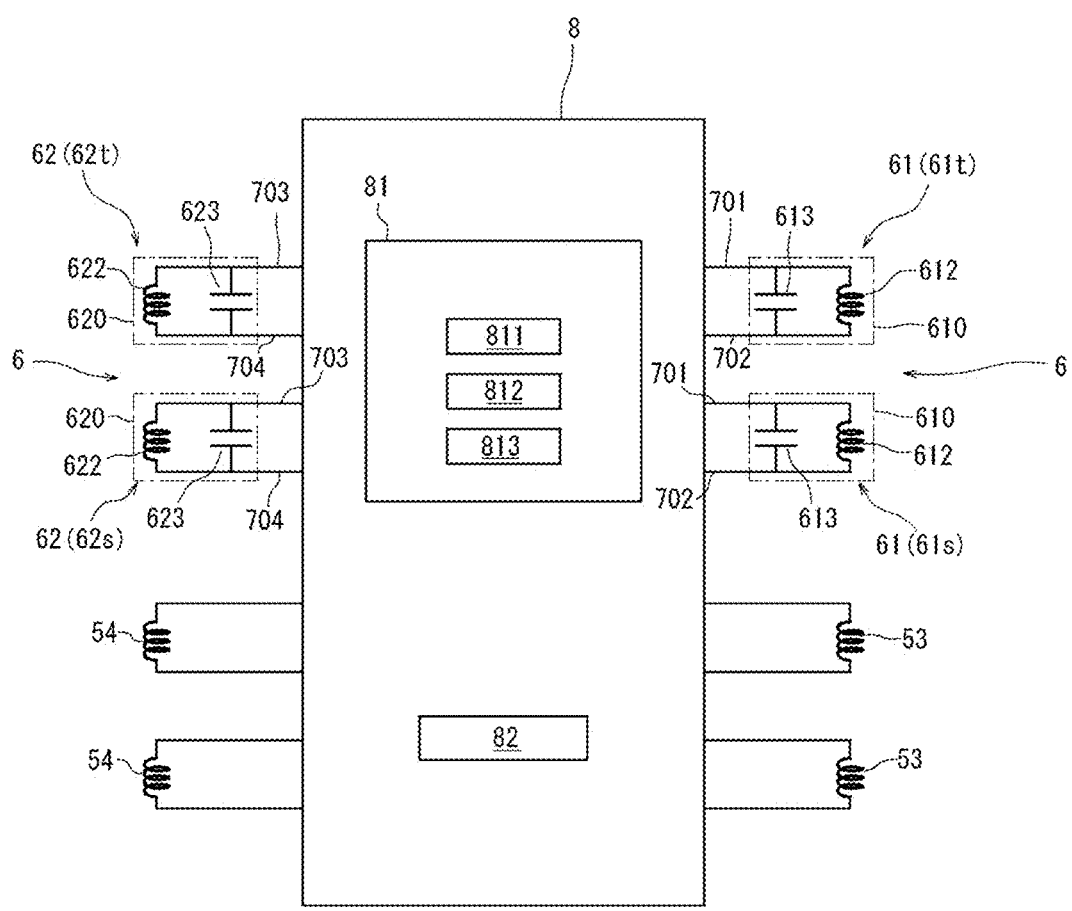
FIG. 7 is an equivalent circuit diagram illustrating connection between an angle detector and a controller according to an example embodiment of the present disclosure.

Next, the angle detector 6 and the controller 8 will be described with reference to the drawings. FIG. 7 is an equivalent circuit diagram illustrating connection of the angle detector 6 and the controller 8. The angle detector 6 detects the angle of the swing portion 1. That is, the angle detector 6 detects the swing angle of the swing portion 1. The angle detector 6 includes a pair of first angle detection elements 61 (including 61s and 61t) and a pair of second angle detection elements 62 (including 62s and 62t). The pair of first angle detection elements 61 and the pair of second angle detection elements 62 are mounted on the wiring substrate 70. That is, the pair of first angle detection elements 61 and the pair of second angle detection elements 62 are disposed above the non-magnetic structure 7.

The pair of first angle detection elements 61 includes a magnetic structure 611, a detection coil 612, and a capacitor 613. As illustrated in FIGS. 1 to 6 and the like, the magnetic structure 611 is formed in a cylindrical shape by sintering powder of a magnetic material such as iron powder. Note that the member forming the magnetic structure 611 is not limited to iron. The magnetic structure 611 extends upward along the central axis Cx from the upper surface of the wiring substrate 70. That is, the magnetic structure 611 extends upward along the central axis Cx direction. In addition, the magnetic structure 611 protrudes upward from the upper surface of the wiring substrate 70.

The magnetic structure 611 may be fixed to the upper portion of the wiring substrate 70, or may be fixed to the non-magnetic structure 7 and formed to penetrate a through hole provided in the wiring substrate 70. The magnetic structure 611 of the present example embodiment is fixed to the upper surface of the wiring substrate 70. The magnetic structure 611 may be soldered to the wiring pattern on the upper surface of the wiring substrate 70, or may be fixed by a fixing method such as adhesion. That is, the first angle detection element 61 includes the columnar magnetic structure 611 disposed between the swing portion 1 and the non-magnetic structure 7 in the central axis Cx direction.

The detection coil 612 is a wiring pattern formed on the wiring substrate 70. By forming the detection coil 612 as a wiring pattern of the wiring substrate 70, the number of components can be reduced. The detection coil 612 surrounds the magnetic structure 611 when viewed from the central axis Cx direction. That is, the first angle detection element 61 includes the detection coil 612 arranged along the outer periphery of the magnetic structure 611. The wiring substrate 70 has terminals 701 and 702 on the upper surface to which the controller 8 is connected. Both ends of the detection coil 612 are connected to the terminals 701 and 702, respectively.

As illustrated in FIGS. 5 to 7 and the like, the capacitor 613 is connected to the terminal 701 and the terminal 702. The capacitor 613 is connected to the controller 8 in parallel with the detection coil 612. That is, the first angle detection element 61 includes the capacitor 613 connected in parallel to the detection coil 612. The detection coil 612 and the capacitor 613 are connected in parallel to form a resonance circuit 610.

The pair of second angle detection elements 62 includes a magnetic structure 621, a detection coil 622, and a capacitor 623. The magnetic structure 621 corresponds to the magnetic structure 611 of the first angle detection element 61. That is, the magnetic structure 621 extends upward along the central axis Cx direction. In addition, the magnetic structure 621 protrudes upward in the central axis Cx direction from the upper surface of the wiring substrate 70.

The detection coil 622 corresponds to the detection coil 612 of the first angle detection element 61. The capacitor 623 corresponds to the capacitor 613 of the first angle detection element 61. That is, the second angle detection element 62 includes the capacitor 623 connected in parallel to the detection coil 622. In addition, the detection coil 622 is a wiring pattern formed on the wiring substrate 70. By forming the detection coil 622 as a wiring pattern of the wiring substrate 70, the number of components can be reduced.

That is, the second angle detection element 62 includes the columnar magnetic structure 621 disposed between the swing portion 1 and the non-magnetic structure 7 in the central axis Cx direction, and the detection coil 622 disposed along the outer periphery of the magnetic structure 621.

As illustrated in FIGS. 5 to 7 and the like, the capacitor 623 is connected to a terminal 703 and a terminal 704. The terminals 703 and 704 have the same configuration as the terminals 701 and 702. Therefore, a detailed description of the terminal 703 and the terminal 704 is omitted. The capacitor 623 is connected to the controller 8 in parallel with the detection coil 622. The detection coil 622 and the capacitor 623 are connected in parallel to form a resonance circuit 620.

As illustrated in FIG. 6, when viewed from the central axis Cx direction, the pair of first angle detection elements 61 is arranged at point-symmetrical positions about the central axis Cx on the second axis C2. More specifically, the pair of first angle detection elements 61 is arranged at positions at equal distances from the central axis Cx direction in opposite directions across the central axis Cx on the second axis C2. That is, the pair of first angle detection elements 61 is disposed in the second axis C2 direction with the first axis C1 interposed therebetween when viewed from the central axis Cx direction. Note that the pair of first angle detection elements 61 only needs to be arranged on both sides sandwiching the first axis C1 and arranged in the second axis C2 direction, and may not be on the second axis C2 when viewed from the central axis Cx direction.

As illustrated in FIG. 3, when the flat plate portion 11 swings about the first axis C1, the first angle detection element 61 is disposed at a position where the upper surface of the magnetic structure 611 always faces the lower surface of the flat plate portion 11 in the central axis Cx direction. That is, regardless of the swing angle of the swing portion 1, the upper end of the magnetic structure 611 faces the lower surface of the swing portion 1 in the central axis Cx direction. With such a configuration, even when the swing portion 1 swings at the maximum swing angle, the magnetic structure 611 faces the lower surface of the swing portion 1. As a result, since the magnetic structure 611 always faces the lower surface of the swing portion 1 in the central axis direction, the angle of the swing portion 1 can be stably detected.

The upper end of the magnetic structure 611 is lower than the upper end of the first stator core 51. That is, the upper end of the magnetic structure 611 is disposed below the upper end of the first stator core 51. With this configuration, when the swing portion 1 swings about the first axis C1, interference between the bottom surface of the flat plate portion 11 and the magnetic structure 611 can be suppressed. Therefore, the actuator 100 can be downsized, or the swing angle of the swing portion 1 can be increased.

As illustrated in FIG. 6, when viewed from the central axis Cx direction, the pair of second angle detection elements 62 is arranged at point-symmetrical positions about the central axis Cx on the first axis C1. More specifically, the pair of second angle detection elements 62 is arranged at positions at equal distances from the central axis Cx direction in opposite directions across the central axis Cx on the first axis C1. That is, the pair of second angle detection elements 62 is disposed in the first axis C1 direction with the second axis C2 interposed therebetween when viewed from the central axis Cx direction. Note that the pair of second angle detection elements 62 only needs to be arranged on both sides sandwiching the second axis C2 and arranged in the direction of the first axis C1, and may not be on the first axis C1 when viewed from the central axis Cx direction.

As illustrated in FIG. 4, when the flat plate portion 11 swings about the second axis C2, the second angle detection element 62 is disposed at a position where the upper surface of the magnetic structure 621 always faces the lower surface of the flat plate portion 11 in the central axis Cx direction. That is, regardless of the swing angle of the swing portion 1, the upper end of the magnetic structure 621 faces the lower surface of the swing portion 1 in the central axis Cx direction. With such a configuration, even when the swing portion 1 swings at the maximum swing angle, the magnetic structure 621 faces the lower surface of the swing portion 1. As a result, since the magnetic structure 621 always faces the lower surface of the swing portion 1 in the central axis direction, the angle of the swing portion 1 can be stably detected.

The upper end of the magnetic structure 621 is lower than the upper end of the second stator core 52. That is, the upper end of the magnetic structure 621 is disposed below the upper end of the second stator core 52 in the central axis Cx direction. With this configuration, when the swing portion 1 swings about the first axis C1, interference between the bottom surface of the flat plate portion 11 and the magnetic structure 611 can be suppressed. Therefore, the actuator 100 can be downsized, or the swing angle of the swing portion 1 can be increased.

The controller 8 is connected to the terminal 701 and the terminal 702 to which the first angle detection element 61 is connected. The controller 8 is connected to terminal 703 and terminal 704 to which second angle detection element 62 is connected. The controller 8 includes a frequency processor 81 and a storage unit 82.

The frequency processor 81 is an integrated circuit, and includes a processing circuit 811, a current supply circuit 812, and a frequency detection circuit 813. The processing circuit 811 includes, for example, an arithmetic processing circuit such as a CPU and an MPU. The current supply circuit 812 supplies a high-frequency current to the detection coil 612 of the first angle detection element 61 via the terminal 701 and the terminal 702.

The frequency detection circuit 813 of the frequency processor 81 detects the resonance frequency of the current flowing through the resonance circuit 610 formed by the detection coil 612 and the capacitor 613 when the high-frequency current is supplied. Then, the processing circuit 811 of the frequency processor 81 acquires the swing state of the swing portion 1 (here, the swing angle around the first axis C1) based on the change in the resonance frequency detected by the frequency detection circuit 813. Details of acquisition of the swing state of the swing portion 1 using the resonance frequency will be described later.

That is, the frequency processor 81 is connected to the detection coil 612, acquires the resonance frequency of the resonance circuit 610 formed by the detection coil 612 and the capacitor 613 while causing the current to flow through the detection coil 612, and acquires the swing angle of the swing portion 1 based on the fluctuation of the resonance frequency.

Similarly, the current supply circuit 812 supplies a high-frequency current to the detection coil 622 of the second angle detection element 62 via the terminal 703 and the terminal 704. Then, in the same manner as described above, the frequency detection circuit 813 acquires the resonance frequency of the resonance circuit 620 formed by the detection coil 622 and the capacitor 623, and the processing circuit 811 detects the swing angle of the flat plate portion 11 of the swing portion 1 around the second axis C2.

That is, the frequency processor 81 is connected to the detection coil 622, acquires the resonance frequency of the resonance circuit 620 formed by the detection coil 622 and the capacitor 623 while causing the current to flow through the detection coil 622, and acquires the swing angle of the swing portion 1 based on the fluctuation of the resonance frequency.

The frequency processor 81 may be an integrated circuit in which a plurality of circuits are integrated, or may be configured by wiring a plurality of circuits on a substrate. Note that the controller 8 may be mounted on the wiring substrate 70 or may be mounted on another substrate.

The storage unit 82 stores information such as information necessary for processing executed by the frequency processor 81 and information on the swing angle acquired by the frequency processor 81. The storage unit 82 includes, for example, a storage circuit such as a ROM and a RAM. Note that the storage circuit described here is an example, and is not limited thereto.

In addition, the frequency processor 81 may include only a processing circuit that performs arithmetic processing, and may be configured to detect the swing angle by reading and executing a program stored in the storage unit 82. The first drive coil 53 and the second drive coil 54 are also connected to the controller 8. The controller 8 also controls power supplied to the first drive coil 53 and the second drive coil 54. The controller 8 controls power supplied to the first drive coil 53 to control a swing angle, a swing speed, and the like of the swing portion 1 around the first axis C1. The controller 8 controls the power supplied to the second drive coil 54 to control the swing angle, the swing speed, and the like of the swing portion 1 around the second axis C2.

Current may be directly supplied from the controller 8 to the first drive coil 53 and the second drive coil 54. However, a current supply circuit (not illustrated) for supplying a current for generating power for swinging the swing portion 1 may be separately provided, and the controller 8 may control the current supply circuit to control the current supplied to the first drive coil 53 and the second drive coil 54.

The actuator 100 according to the present example embodiment has the above-described configuration.

Hereinafter, the operation of the actuator 100 will be described. The controller 8 supplies a current to the first drive coil 53 and the second drive coil 54 disposed in the support portion 3. The swing portion 1 is operated by the magnetic force generated in the first stator core 51 and the second stator core 52 by the energization of the first drive coil 53 and the second drive coil 54 and the magnetic force of the magnet 13. That is, the support portion 3 forms a magnetic circuit with the magnet 13. The operation of the swing portion 1 is as follows.

For example, the controller 8 supplies a current to the first drive coil 53. As a result, a magnetic field is generated inside the first stator core 51. As currents in opposite directions are supplied to the two first drive coils 53, one of the end surfaces 563 opposing each other in the direction along the second axis C2 serves as the N pole and the other serves as the S pole. Assuming that the lower surface of the magnet 13 is the magnetic pole surface and is the S pole, the magnet 13 is pulled toward the end surface 563 serving as the N pole, and repels the end surface 563 serving as the S pole.

At this time, the shaft 12 holding the magnet 13 is swingably supported by the frame portion 2 via the first bearing 41. Therefore, the swing portion 1 having the flat plate portion 11 to which the shaft 12 has been fixed is inclined with the first axis C1 as the center (see FIG. 3). Then, the swing portion 1 swings about the first axis C1 as the currents flowing to the first drive coil 53 are controlled to switch between the N pole and the S pole of the end surfaces 563.

Similarly, a current is supplied to the second drive coil 54 by the controller 8. As a result, a magnetic field is generated inside the second stator core 52. The swing portion 1 and the frame portion 2 are inclined with the second axis C2 as the center due to the magnetic force between the two end surfaces 583 and the magnet 13. In other words, the swing portion 1 is inclined together with the frame portion 2 with the second axis C2 as the center. Then, the swing portion 1 swings about the second axis C2 together with the frame portion 2 as the currents flowing to the second drive coil 54 are controlled to switch between the N pole and the S pole of the end surfaces 583.

Then, in the actuator 100, the controller 8 controls the current supplied to the first drive coil 53 and the second drive coil 54 based on the swing angle of the swing portion 1 around the first axis C1 and the second axis C2 detected by the angle detector 6. As a result, the swing portion 1 is swung at a predetermined swinging angle around the first axis C1 and the second axis C2.

As described above, the actuator 100 detects the angle of the swing portion 1 using the angle detector 6. First, detection of the swing angle of the swing portion 1 around the first axis C1 using the pair of first angle detection elements 61 will be described. Hereinafter, in the detection of the swing angle, the pair of first angle detection elements 61 will be described separately as one first angle detection element 61s and the other first angle detection element 61t.

As illustrated in FIG. 6, one first angle detection element 61s and the other first angle detection element 61t are arranged at point-symmetric positions about the central axis Cx on the second axis C2 as viewed from the central axis Cx direction. In this state, when the swing portion 1 is inclined in the direction shown in FIG. 3 around the first axis C1, the bottom surface of the flat plate portion 11 approaches one first angle detection element 61s and separates from the other first angle detection element 61t. In addition, when the swing portion 1 is inclined in the opposite direction, approaching and separating are reversed. When the swing portion 1 swings periodically around the first axis C1, the distance between one first angle detection element 61s and the lower surface of the flat plate portion 11 and the distance between the other first angle detection element 61t and the lower surface of the flat plate portion 11 change at the same cycle.

As described above, the high-frequency current is supplied from the current supply circuit 812 of the controller 8 to the detection coils 612 of the pair of first angle detection elements 61. As a result, a magnetic flux is generated in the magnetic structure 611. Since the magnetic structure 611 is disposed above the non-magnetic structure 7, the influence of the magnetic flux of the first drive coil 53 and the second drive coil 54 on the magnetic flux generated in the magnetic structure 611 is suppressed.

The upper surface of the magnetic structure 611 intersects with the central axis Cx. That is, the upper end of the magnetic structure 611 has a flat surface intersecting the central axis Cx. An upper surface of the magnetic structure 611 is a magnetic pole surface, and an eddy current is generated in the flat plate portion 11 by a magnetic flux from the upper surface. Since the upper surface of the magnetic structure 611 is a flat surface, the detection surface facing the swing portion 1 in the central axis Cx direction can be enlarged, a stable eddy current can be generated in the flat plate portion 11, and stable detection is possible. In addition, a member formed in a columnar shape can be used as the magnetic structure 611, and the magnetic structure 611 can be easily manufactured.

The inductance of the detection coil 612 changes under the influence of the eddy current. The eddy current changes depending on the distance between the lower surface of the flat plate portion 11 and the upper surface of the magnetic structure 611, and the inductance of the detection coil 612 also changes accordingly.

Then, as the inductance of the detection coil 612 changes, the resonance frequency of the resonance circuit 610 formed by the detection coil 612 and the capacitor 613 also changes. When the swing portion 1 swings at a predetermined period, the resonance frequency of the resonance circuit 610 formed by the detection coil 612 of one first angle detection element 61s and the capacitor 613 and the resonance frequency of the resonance circuit 610 formed by the detection coil 612 of the other first angle detection element 61t and the capacitor 613 also change periodically.

Therefore, the resonance frequency of the resonance circuit 610 formed by the detection coil 612 and the capacitor 613 of one first angle detection element 61s is set as a first resonance frequency F11, and the resonance frequency of the resonance circuit 610 formed by the detection coil 612 and the capacitor 613 of the other first angle detection element 61t is set as a second resonance frequency F12.

Then, the processing circuit 811 of the frequency processor 81 calculates an angle detection parameter Fn1. Note that the angle detection parameter is obtained by the following Expression.

$$Fn1=(F11-F12)/(F11+F12)$$

The angle detection parameter Fn1 monotonously changes when the swing portion 1 swings around the first axis C1. Therefore, a table in which the angle detection parameter Fn1 and the angle of the swing portion 1 with respect to the horizontal state when the swing portion 1 swings about the first axis C1 are associated with each other is stored in the storage unit 82, and the swing angle of the swing portion 1 is acquired using the angle detection parameter Fn1 and the table. Here, the table may be a numerical table in which the angle detection parameter Fn1 for each angle is set, or may be a graph. In addition, an arithmetic expression that can calculate the swing angle from the angle detection parameter Fn1 may be used.

The eddy current generated in the flat plate portion 11 is likely to change due to a change in the distance between the lower surface of the flat plate portion 11 and the upper surfaces of the magnetic structure 611 and the magnetic structure, and the first resonance frequency F11 and the second resonance frequency F12 are also likely to change. Therefore, even if the swing angle of the swing portion 1 is small, the angle detection parameter Fn1 is likely to change. For example, the angle detection parameter Fn1 easily varies with respect to the angle as compared with a parameter in an optical detection device that irradiates the swing portion 1 with light, detects the reflected light to measure the distance, and detects the angle of the swing portion 1. That is, by using the angle detector 6, when the swing portion 1 swings around the first axis C1, it is possible to detect a fine change in angle as compared with the case of using the optical angle detector.

Even when the distance between the swing portion 1 and the magnetic structure 611 at the time of detecting the angle is long, the angle of the swing portion 1 can be accurately detected. Therefore, the actuator 100 can be downsized as compared with a case where an optical angle detector is provided.

The upper surface of the magnetic structure 621 also intersects with the central axis Cx. That is, the upper end of the magnetic structure 621 has a flat surface intersecting the central axis Cx. An upper surface of the magnetic structure 621 is a magnetic pole surface, and an eddy current is generated in the flat plate portion 11 by a magnetic flux from the upper surface. Since the upper surface of the magnetic structure 621 is a flat surface, the detection surface facing the swing portion 1 in the central axis Cx direction can be enlarged, a stable eddy current can be generated in the flat plate portion 11, and stable detection is possible. In addition, a member formed in a columnar shape can be used as the magnetic structure 621, and the magnetic structure 621 can be easily manufactured.

In addition, the swing angle of the swing portion 1 swinging about the second axis C2 is also obtained from resonance frequencies F21 and F22 of the resonance circuit 620 formed by the detection coils 622 and the capacitors 623 of the pair of second angle detection elements 62, and an angle detection parameter Fn2 is obtained by the following Expression.

$$Fn2=(Fn21-Fn22)/(Fn21+Fn22)$$

As a result, the angle of the swing portion 1 around the second axis C2 can be detected with accuracy equivalent to the detection of the angle of the swing portion 1 around the first axis C1 described above. That is, by using the angle detector 6, when the swing portion 1 swings around the second axis C2, it is possible to detect a fine change in angle as compared with the case of using the optical angle detector.

The storage unit 82 may include a table in which the angle detection parameter Fn1 is associated with the angle when the swing portion 1 swings around the first axis C1, and a table in which the angle detection parameter Fn2 is associated with the angle when the swing portion 1 swings around the second axis C2. In addition, both the angle around the first axis C1 and the angle around the second axis C2 may be acquired using one table.

In the actuator 100, a controller 8 irradiates the irradiation target with light (hereinafter, referred to as scanning light) reflected by a reflecting surface 111 of a flat plate portion 11, and detects the reflected light to acquire the position, shape, and the like of the irradiation target. The controller 8 determines the light irradiation position based on the angle of the swing portion 1. In a case where the position of the object irradiated with the scanning light is far, the deviation of the position of the irradiated scanning light becomes large even if the angle of the swing portion 1 is small.

In the actuator 100 of the present example embodiment, the angle detection parameter Fn1 that easily fluctuates with respect to the change in angle is used. Therefore, in the actuator 100 of the present example embodiment, a fine change in the swing angle of the swing portion 1 can be detected as compared with the case of using the conventional optical angle detector. For this reason, the actuator 100 of the present example embodiment has higher resolution at the time of detecting the position and shape of the object due to the reflection of the scanning light than the actuator using the conventional optical angle detector. This difference in resolution becomes more remarkable when the position and shape of the distant object are detected.

The angle detection parameter Fn1 uses the first resonance frequency F11 and the second resonance frequency F12 acquired from the resonance circuit 610 of the pair of first angle detection elements 61 arranged with the first axis C1 interposed therebetween when viewed from the central axis Cx direction. The angle detection parameter Fn1 monotonously changes with respect to the angle of the swing portion 1 calculated based on the first resonance frequency F11 and the second resonance frequency F12, and is a dimensionless value.

Similarly, as the angle detection parameter Fn2, the first resonance frequency F21 and the second resonance frequency F22 acquired from the resonance circuit 620 of the pair of second angle detection elements 62 arranged with the second axis C2 interposed therebetween when viewed from the central axis Cx direction are used. The angle detection parameter Fn2 monotonously changes with respect to the angle of the swing portion 1 calculated based on the first resonance frequency F21 and the second resonance frequency F22, and is a dimensionless value.

Therefore, by using the angle detection parameter Fn1 and the angle detection parameter Fn2, it is possible to remove the influence of a factor that can change the resonance frequency such as the conductivity due to the temperature change of the flat plate portion 11. That is, the accuracy of angle detection of the swing portion 1 is less likely to decrease due to a change in ambient temperature. That is, the actuator 100 of the present example embodiment can accurately acquire the position and shape of the object even in a case where the actuator is adopted in a place where the temperature change is large. For example, even in a place where it is difficult to use an actuator having an optical angle detector whose accuracy is likely to decrease due to a temperature change, the position and shape of the object can be accurately and stably acquired by using the actuator 100 of the present example embodiment.

Figure 8:
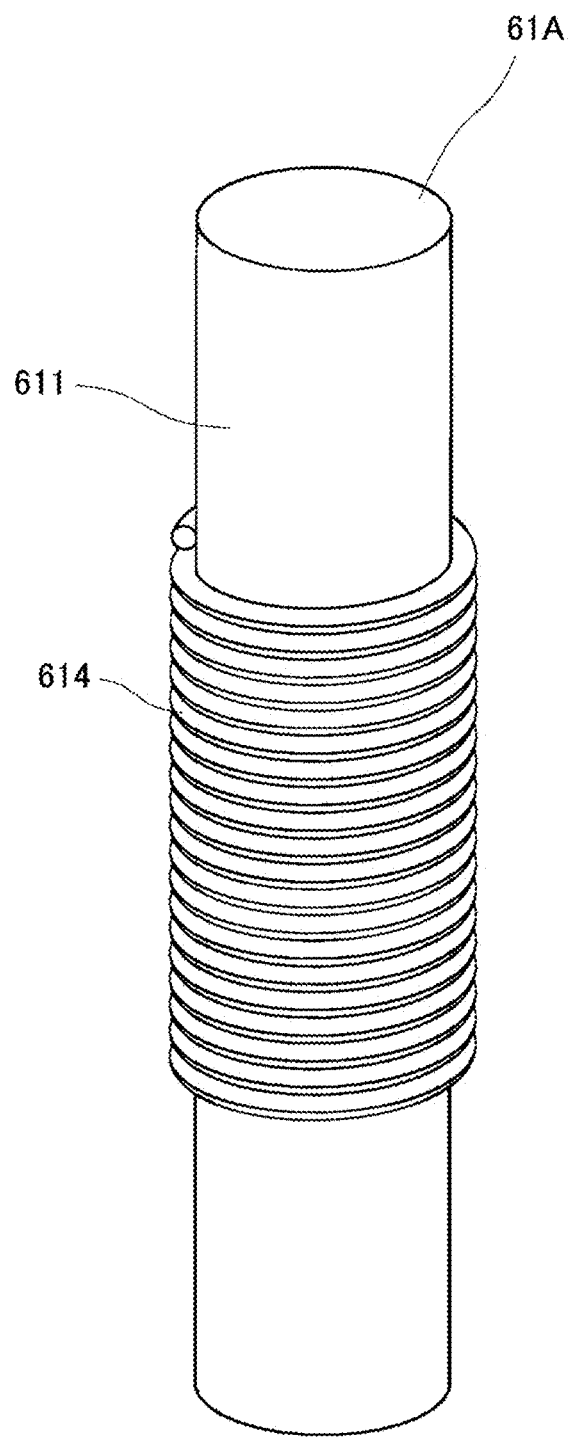
FIG. 8 is a perspective view illustrating a first angle detection element according to a modification of an example embodiment of the present disclosure.

FIG. 8 is a perspective view illustrating a first angle detection element 61A of a modification. The first angle detection element 61A illustrated in FIG. 8 is different from the first angle detection element 61 in that a detection coil 614 is used instead of the detection coil 612. The other parts of the first angle detection element 61A are the same as those of the first angle detection element 61. Therefore, substantially the same portions as those of the first angle detection element 61 in the first angle detection element 61A are denoted by the same reference numerals, and the detailed description of the same portions is omitted.

As illustrated in FIG. 8, the detection coil 614 of the first angle detection element 61A is a winding that surrounds the outer peripheral surface of the magnetic structure 611. That is, the detection coil 614 has a shape in which a lead wire is spirally wound. As described above, by forming the detection coil 614 as a winding that surrounds the magnetic structure 611, the number of turns, the linear density, and the like of the detection coil 614 can be easily adjusted. Therefore, it is possible to provide an angle detection element according to required detection accuracy.

The length of the detection coil 614 is shorter than the length of the magnetic structure 611. Both ends of the detection coil 614 are arranged in a range sandwiched between both ends of the magnetic structure 611 in the axial direction. With such a formation, the detection coil 614, which is a winding, is hardly unwound.

Note that the detection coil 614 may be formed by winding a lead wire around the magnetic structure 611, or may be formed in advance as an air-core coil and attached to the outer periphery of the magnetic structure 611.

Although the first angle detection element 61 has been described, the second angle detection element 62 may have a similar configuration, that is, a configuration including a detection coil for a winding surrounding the outer peripheral surface.

Figure 9:
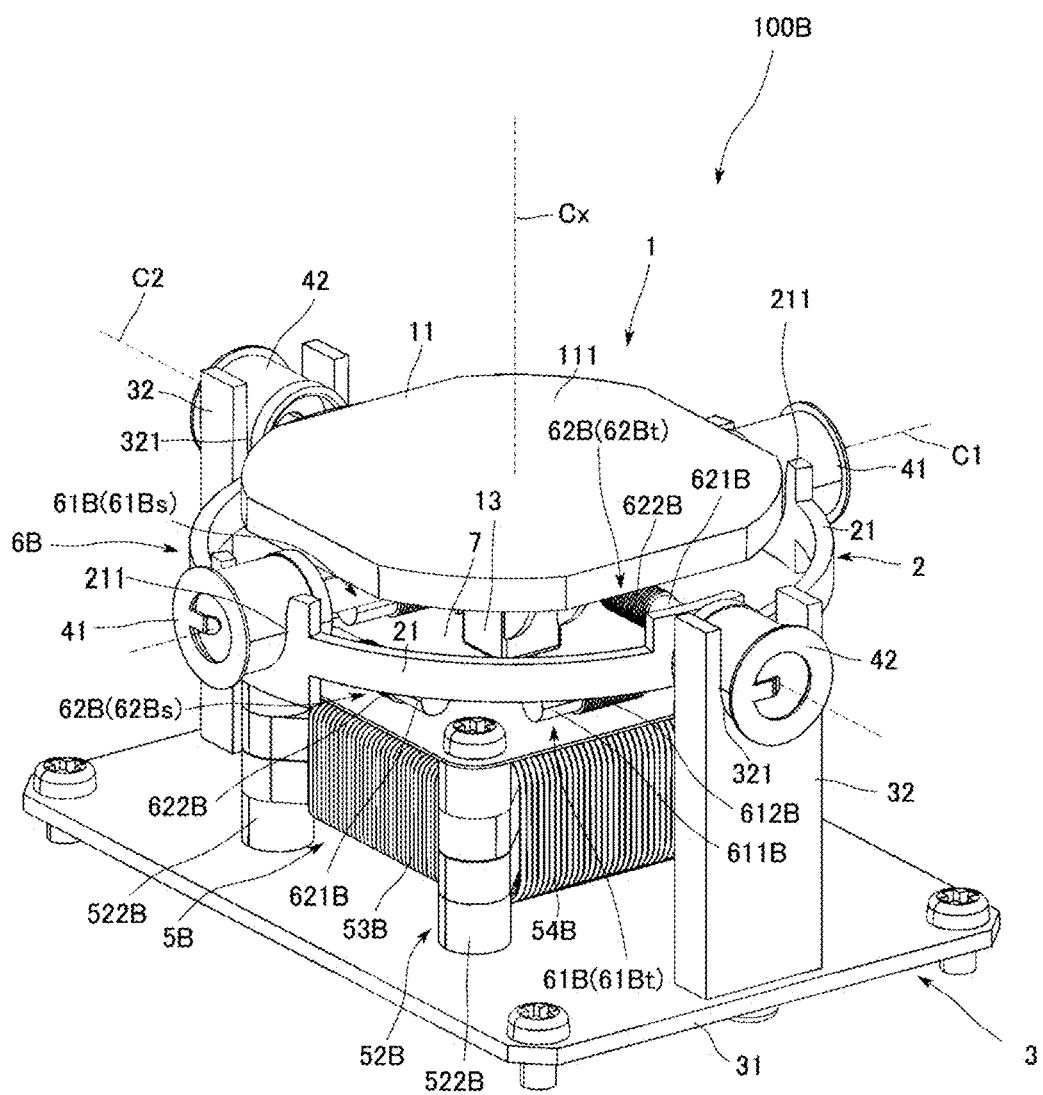
FIG. 9 is a perspective view of another example embodiment of the actuator according to the present disclosure.
Figure 10:
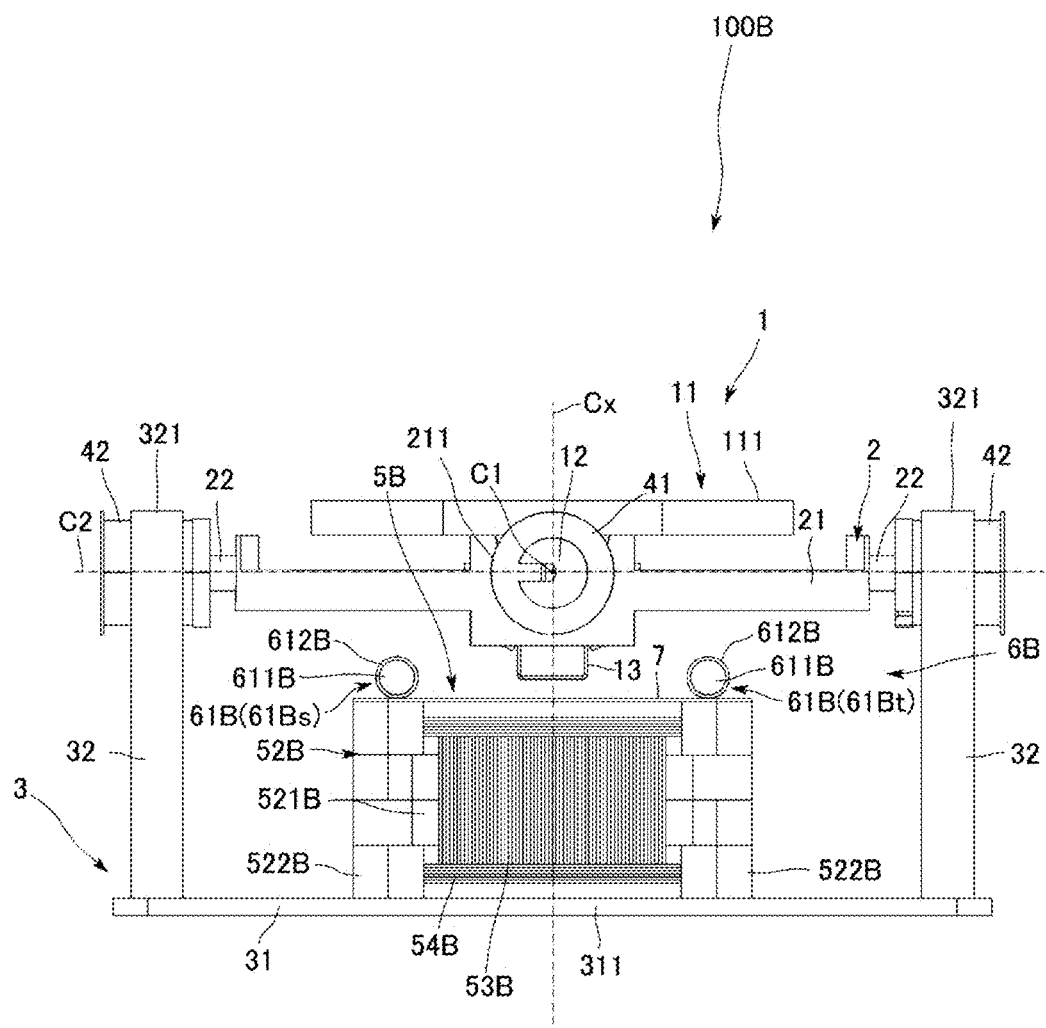
FIG. 10 is a side view of the actuator illustrated in FIG. 9 as viewed from the first axis direction.
Figure 11:
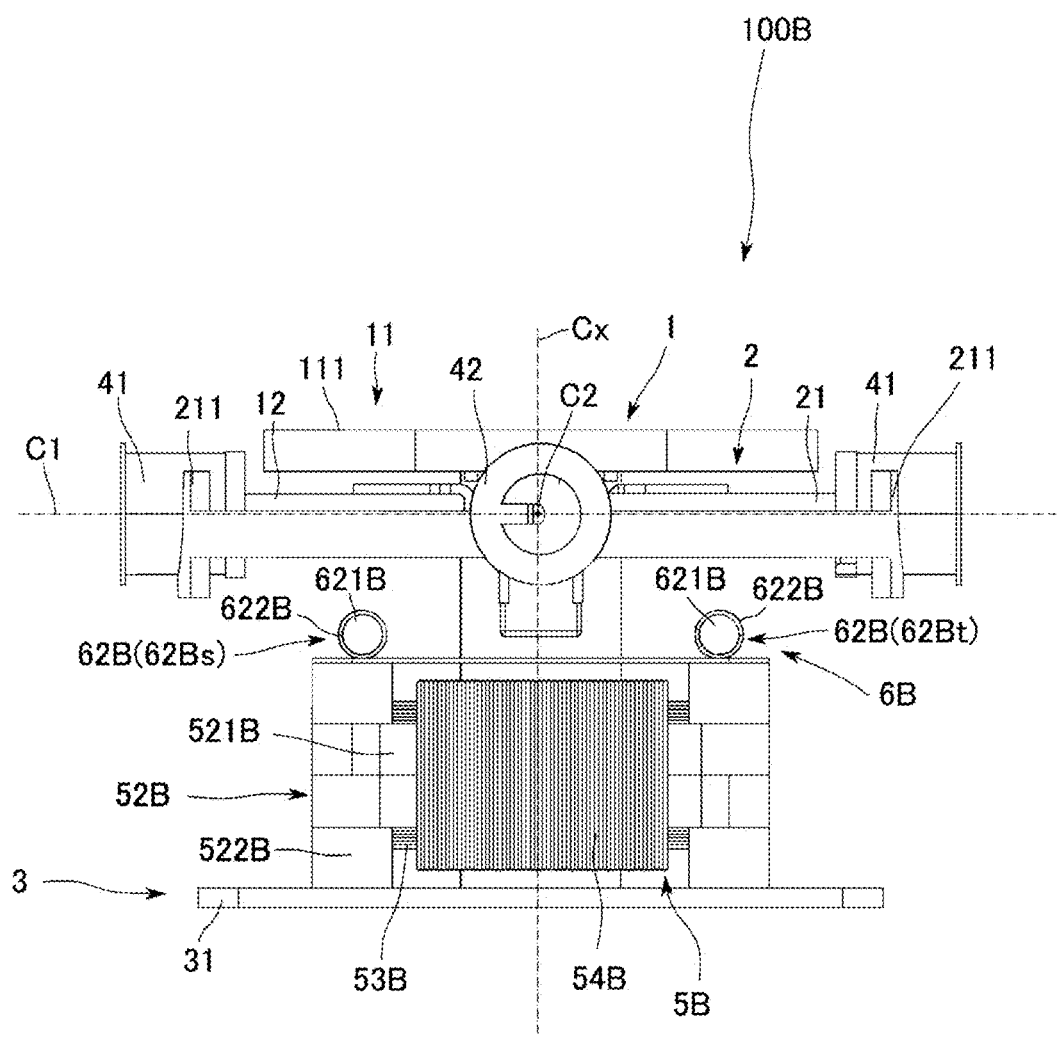
FIG. 11 is a side view of the actuator as viewed in the second axis direction.
Figure 12:
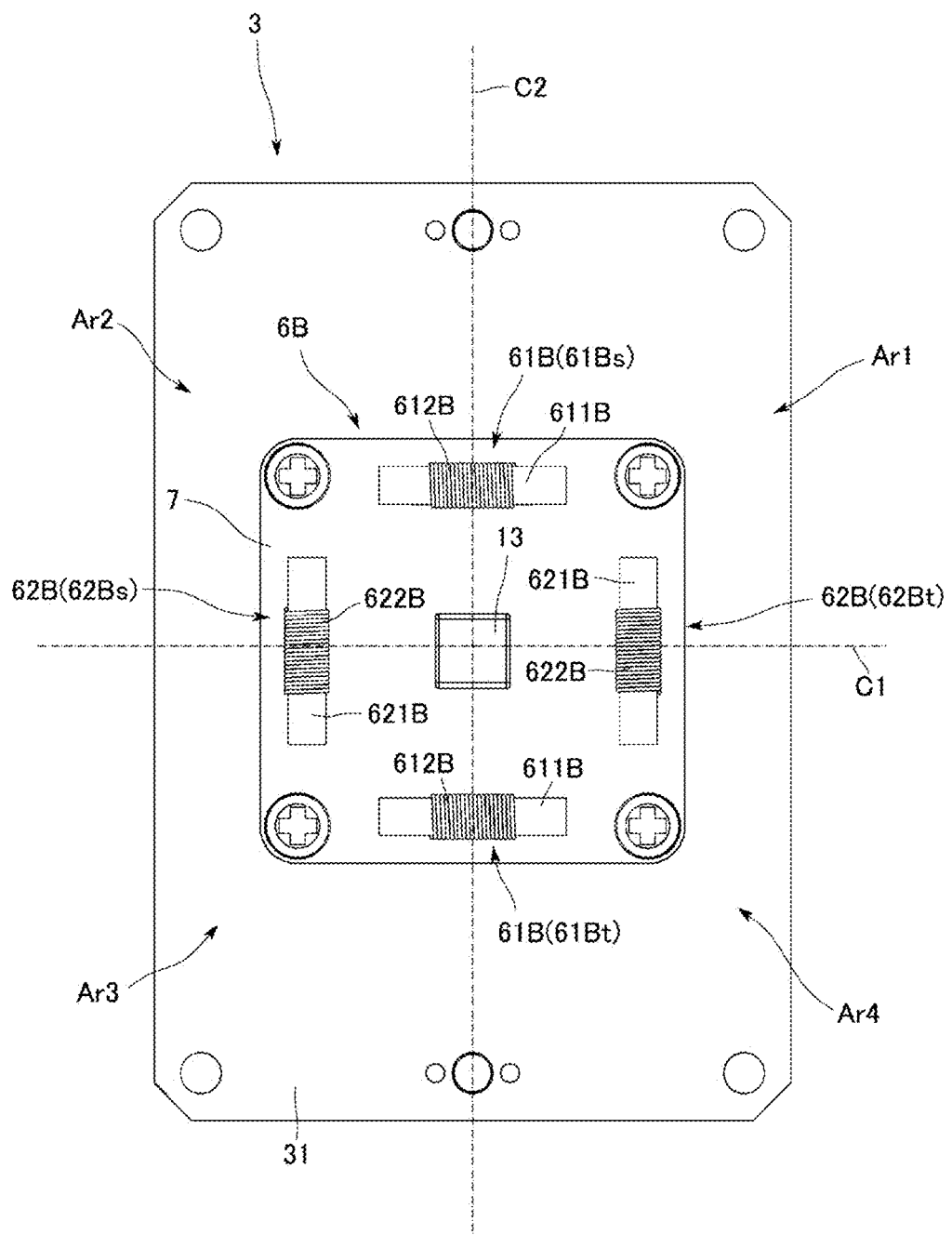
FIG. 12 is a plan view of the support portion of the actuator.
Figure 13:
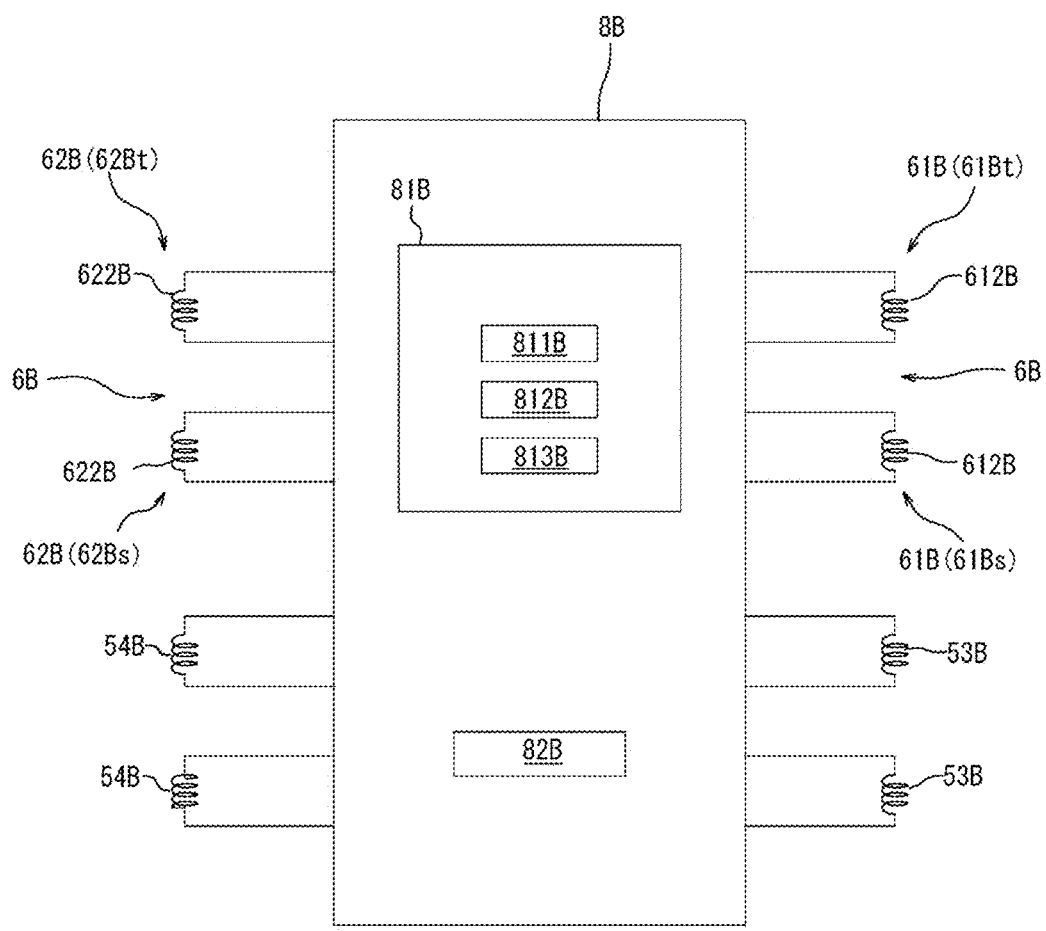
FIG. 13 is an equivalent circuit diagram illustrating connection between the angle detector and the controller according to an example embodiment of the present disclosure.

An actuator 100B of a first modification will be described with reference to the drawings. FIG. 9 is a perspective view of another example of the actuator 100B according to the present disclosure. FIG. 10 is a side view of the actuator 100B illustrated in FIG. 9 as viewed from the first axis C1 direction. FIG. 11 is a side view of the actuator 100B as viewed from the second axis C2 direction. FIG. 12 is a plan view of the support portion 3 of the actuator 100B. FIG. 13 is an equivalent circuit diagram illustrating connection of an angle detector 6B and a controller 8B. The central axis Cx, the first axis C1, and the second axis C2 are the same as those of the actuator 100.

In the actuator 100B according to the first modification, a drive assembly 5B, the angle detector 6B, and the controller 8B are different from the drive assembly 5, the angle detector 6, and the controller 8 of the actuator 100. The other parts of the actuator 100B have the same configuration as the actuator 100. Therefore, substantially the same portions of the actuator 100B as those of the actuator 100 are denoted by the same reference numerals, and the detailed description of the same portions is omitted. In the actuator 100B illustrated in FIG. 10, the support arm 32 is not illustrated.

As illustrated in FIGS. 9 to 11, the drive assembly 5B includes a stator core (not illustrated), an insulator 52B, a first drive coil 53B, and a second drive coil 54B. The stator core is a plate member having a square shape when viewed from the central axis Cx direction, and is laminated in the central axis Cx direction. The insulator 52B is formed of an insulating material such as resin or ceramic. The insulator 52B includes a box-shaped accommodating portion 521B and a support column 522B.

The accommodating portion 521B is a rectangular parallelepiped box, and has a square shape when viewed from the central axis Cx direction. A stator core is accommodated in the accommodating portion 521B. As illustrated in FIGS. 9, 12, and the like, the insulator 52B has four support columns 522B, and each of the support columns 522B is disposed at four corners of the accommodating portion 521B. Each of the support columns 522B has a cylindrical shape extending in the central axis Cx direction. As illustrated in FIGS. 10 and 11, the upper end of the support column 522B is disposed above the upper surface of the accommodating portion 521B, and the lower end of the support column 522B is disposed below the lower surface of the accommodating portion 521B.

The insulator 52B is fixed to the base plate 31 of the support portion 3 by screwing with a screw passing through the support column 522B. At this time, a gap is formed between the lower surface of the accommodating portion 521B and the upper surface of the base plate 31. A part of the first drive coil 53B and a part of the second drive coil 54B are disposed in this gap, and contact between the first drive coil 53B and the second drive coil 54B and the base plate 31 is suppressed.

The non-magnetic structure 7 is fixed to the upper surface of the support portion 3 with a screw for fixing the insulator 52B to the base plate 31. At this time, a gap is formed between the upper surface of the accommodating portion 521B and the non-magnetic structure 7. A part of the first drive coil 53B and a part of the second drive coil 54B are arranged in this gap, and contact between the first drive coil 53B and the second drive coil 54B and the non-magnetic structure 7 is suppressed.

In the insulator 52B attached to the support portion 3, the normal direction of each of the side surfaces of the accommodating portion 521B is the first axis C1 or the second axis C2 when viewed from the central axis Cx direction. The first drive coil 53B is formed by winding a lead wire around a pair of side surfaces, an upper surface, and a lower surface of the first axis C1 in the normal direction. By supplying a current to the first drive coil 53B, a magnetic flux is generated in a direction along the second axis C2. The magnetic flux generated by the first drive coil 53B acts on the magnet 13 to swing the swing portion 1 about the first axis C1.

The second drive coil 54B is formed by winding a lead wire around a pair of side surfaces, an upper surface, and a lower surface of the second axis C2 in the normal direction. By supplying a current to the second drive coil 54B, a magnetic flux is generated in a direction along the first axis C1. The magnetic flux generated by the second drive coil 54B acts on the magnet 13 to swing the swing portion 1 about the second axis C2.

The angle detector 6B includes a pair of first angle detection elements 61B (including 61Bs and 61Bt) and a pair of second angle detection elements 62B (including 62Bs and 62Bt). The first angle detection element 61B includes a magnetic structure 611B and a detection coil 612B. Similarly to the magnetic structure 611 of the first angle detection element 61, the magnetic structure 611B has a columnar shape made of a magnetic material.

That is, the detection coil 612B of the first angle detection element 61B is a winding that surrounds the outer peripheral surface of the magnetic structure 611B. The detection coil 612B has a shape in which a lead wire is spirally wound. The length of the detection coil 612B is shorter than the length of the magnetic structure 611B. Both ends of the detection coil 612B are arranged in a range sandwiched between both ends of the magnetic structure 611B in the axial direction. With such a formation, the detection coil 612B, which is a winding, is less likely to come off from the magnetic structure 611B and is less likely to be unwound.

Note that the detection coil 612B may be formed by winding a lead wire around the magnetic structure 611B, or may be formed in advance as an air-core coil and attached to the outer periphery of the magnetic structure 611B.

The second angle detection element 62B has the same configuration as the first angle detection element 61B. That is, the second angle detection element 62B includes a magnetic structure 621B and a detection coil 622B. That is, the detection coil 622B of the second angle detection element 62B is a winding that surrounds the outer peripheral surface of the magnetic structure 621B.

As illustrated in FIGS. 9 to 12, the pair of first angle detection elements 61B and the pair of second angle detection elements 62B are disposed on the upper surface of the non-magnetic structure 7. Here, details of the arrangement of the pair of first angle detection elements 61B and the pair of second angle detection elements 62B in the non-magnetic structure 7 will be described.

As illustrated in FIG. 12, when viewed from the central axis Cx direction, the pair of first angle detection elements 61B is arranged with a gap from the magnet 13 in the second axis C2 direction with the magnet 13 interposed therebetween. In the actuator 100B of the present example embodiment, the distances between the first angle detection elements 61B and the magnet 13 in the direction of the second axis C2 are equal. The magnetic structures 611B of the pair of first angle detection elements 61B extend in the direction of the first axis C1.

In addition, as illustrated in FIG. 12, when viewed from the central axis Cx direction, the pair of second angle detection elements 62B is arranged with a gap from the magnet 13 in the first axis C1 direction with the magnet 13 interposed therebetween. In the actuator 100B of the present example embodiment, the distances between the second angle detection elements 62B and the magnet 13 in the direction of the first axis C1 are equal. The magnetic structures 621B of the pair of second angle detection elements 62B extend in the direction of the second axis C2.

The controller 8B is connected to the detection coil 612B of the first angle detection element 61B. In addition, the controller 8B is connected to the detection coil 622B of the second angle detection element 62B. As illustrated in FIG. 13, the controller 8B includes an inductance processor 81B and a storage unit 82B.

The inductance processor 81B is an integrated circuit, and includes a processing circuit 811B, a current supply circuit 812B, and an inductance detection circuit 813B. The processing circuit 811B includes, for example, an arithmetic processing circuit such as a CPU or an MPU. The current supply circuit 812B supplies a high-frequency current to the detection coil 612B of the first angle detection element 61B.

The inductance detection circuit 813B of the inductance processor 81B detects the inductance of the detection coil 612B. Then, the processing circuit 811B acquires the swing state of the swing portion 1, here, the swing angle around the first axis C1 based on the change in inductance detected by the inductance detection circuit 813B.

That is, the inductance processor 81B is connected to the detection coil 612B and acquires the inductance of the detection coil 612B while causing a current to flow through the detection coil 612B. Then, the inductance processor 81B acquires the swing angle of the swing portion 1 based on the variation in inductance.

Similarly, the current supply circuit 812B supplies a high-frequency current to the detection coil 622B of the second angle detection element 62B. Then, in the same manner as described above, the inductance detection circuit 813B acquires the inductance of the detection coil 622B, and the processing circuit 811B acquires the swing angle of the flat plate portion 11 of the swing portion 1 around the second axis C2.

The inductance processor 81B may be an integrated circuit in which a plurality of circuits is integrated, or may be configured by wiring a plurality of circuits on a substrate. Note that the controller 8B may be mounted on the wiring substrate 70 or may be mounted on another substrate.

In addition, the inductance processor 81B may include only a processing circuit that performs arithmetic processing, and may be configured to detect the swing angle by reading and executing a program stored in the storage unit 82. Note that the first drive coil 53B and the second drive coil 54B are also connected to the controller 8B. The controller 8B also controls power supplied to the first drive coil 53B and the second drive coil 54B. The controller 8B controls the power supplied to the first drive coil 53B to control the swing angle, the swing speed, and the like of the swing portion 1 around the first axis C1. The controller 8B controls the power supplied to the second drive coil 54B to control the swing angle, the swing speed, and the like of the swing portion 1 around the second axis C2.

Current may be directly supplied from the controller 8B to the first drive coil 53B and the second drive coil 54B. However, a current supply circuit (not illustrated) for supplying a current for generating power for swinging the swing portion 1 may be separately provided, and the controller 8B may control the current supply circuit to control the current supplied to the first drive coil 53B and the second drive coil 54B.

As described above, the actuator 100B detects the angle of the swing portion 1 using the angle detector 6. First, detection of the swing angle of the swing portion 1 around the first axis C1 using the pair of first angle detection elements 61B will be described. Hereinafter, in the detection of the swing angle, the pair of first angle detection elements 61B will be described separately as one first angle detection element 61Bs and the other first angle detection element 61Bt.

As described above, the high-frequency current is supplied from the current supply circuit 812B of the controller 8 to the detection coils 612B of the pair of first angle detection elements 61B. As a result, a magnetic flux is generated in the magnetic structure 611B. Since the magnetic structure 611B is disposed above the non-magnetic structure 7, the influence of the magnetic flux of the first drive coil 53B and the second drive coil 54B on the magnetic flux generated in the magnetic structure 611B is suppressed.

The magnetic permeability of the magnetic structure 611B is changed by the magnetic flux from the magnet 13. In other words, when the swing portion 1 swings around the first axis C1, the magnet 13 approaches or separates from the magnetic structure 611B, and the distance between the magnet 13 and the magnetic structure 611B changes. As a result, the magnetic flux of the magnet 13 acting on the magnetic structure 611B also changes, and the magnetic permeability of the magnetic structure 611B changes. Accordingly, the inductance of the detection coil 612B changes.

The inductance detection circuit 813B detects the inductance of the detection coil 612B, and the inductance processor 81B detects the swing of the swing portion 1 around the first axis C1 based on the change in the inductance of the detection coil 612B.

Therefore, the inductance of the detection coil 612B of one first angle detection element 61Bs is set as a first inductance L11, and the inductance of the detection coil 612B of the other first angle detection element 61Bt is set as a second inductance L12.

Then, the processing circuit 811B of the inductance processor 81B calculates the angle detection parameter Ln1. Note that the angle detection parameter Ln1 is obtained by the following Expression.

$$Ln1 = (L11 - L12)/(L11 + L12)$$

As a method of acquiring the swing state of the swing portion 1 about the first axis C1 by the angle detection parameter Ln1, the table stored in the storage unit 82 is used as in the case of using the angle detection parameter Fn1. Details of a method of acquiring the swing state of the swing portion 1 around the first axis C1 using the angle detection parameter Ln1 will be omitted.

The swing angle of the swing portion 1 swinging about the second axis C2 also uses the angle detection parameter Ln2 from the inductances L21 and L22 of the detection coils 622B of the pair of second angle detection elements 62B. Note that the angle detection parameter Ln2 is obtained by the following Expression.

$$Ln2 = (Ln21 - Ln22)/(Ln21 + Ln22)$$

As a result, the angle of the swing portion 1 around the second axis C2 can be detected with accuracy equivalent to the detection of the angle of the swing portion 1 around the first axis C1 described above. The inductances of the detection coil 612B and the detection coil 622B easily fluctuate with respect to the distances between the magnet 13 and the first angle detection element 61B and between the magnet 13 and the second angle detection element 62B. Therefore, a small change can be detected by using the inductance. Therefore, it is possible to increase the resolution at the time of detecting the swing angle and to detect the swing angle of the swing portion with higher detection accuracy.

That is, by using the angle detector 6B, the swing state of the swing portion 1 around the first axis C1 and the swing state of the swing portion 1 around the second axis C2 can be detected with a finer change in angle than in the case of using the optical angle detector.

In the actuator 100B, the first angle detection element 61B extends along the second axis C2, and the second angle detection element 62B extends along the first axis C1. Therefore, the first angle detection element 61B and the second angle detection element 62B are less likely to interfere when the swing portion 1 swings. Although the capacitor is omitted in the actuator 100B of the present example embodiment, a capacitor may be provided.

Although the swing portion 1 has been described as an example of the swing portion in the above-described example embodiment, the disclosure is not limited thereto. It is also possible to use the actuator for a purpose other than optics, such as optical scanning. At this time, the swing portion has a configuration that is suitable for the purposes.

Although the example embodiments of the present disclosure have been described above, the present disclosure is not limited to this content. Further, various modifications can be made to the example embodiments of the present disclosure as long as they do not deviate from the purpose of the disclosure.

The optical scanning device of the present disclosure can be used for a detection device that detects a distance to a surrounding object, a shape of an object, and the like by scanning and irradiating the surroundings with light and acquiring the reflected light. In addition to this, the optical scanning device can be also used as an actuator of a device which is used by being swung about two orthogonal axes.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An actuator comprising:
    a swing portion that is electrically conductive;
    a frame portion to support the swing portion such that the swing portion is swingable about a first axis orthogonal to a central axis extending vertically;
    a support portion to support the frame portion such that the frame portion is swingable about a second axis orthogonal to the first axis and intersecting the central axis;
    a magnet below the swing portion;
    a drive assembly including a drive coil defined by a lead wire wound around a stator core in the support portion and extending in the central axis direction;
    a non-magnetic structure between the swing portion and the drive coil in the central axis direction; and
    an angle detector to detect a swing angle of the swing portion; wherein
    the angle detector includes a pair of first angle detection elements extending in the second axis direction with the first axis interposed therebetween and a pair of second angle detection elements extending in the first axis direction with the second axis interposed therebetween when viewed from the central axis direction, and the angle detector is above the non-magnetic structure; and
    each of the first angle detection elements and each of the second angle detection elements include:
        a columnar magnetic structure between the swing portion and the non-magnetic structure in the central axis direction; and
        a detection coil extending along an outer periphery of the magnetic structure; and
    the drive coil is inside an outer edge of the non-magnetic structure when viewed from the central axis direction.

2. The actuator according to claim 1, wherein
    the magnetic structure extends upward along the central axis direction;
    each of the first angle detection element and the second angle detection element includes a capacitor connected in parallel to the detection coil; and
    the actuator further includes:
    a frequency processor connected to the detection coil to acquire a resonance frequency of a resonance circuit including the detection coil and the capacitor while causing a current to flow through the detection coil, and acquire a swing angle of the swing portion based on a fluctuation of the resonance frequency.

3. The actuator according to claim 2, wherein
    an upper end of the magnetic structure in the central axis direction includes a flat surface intersecting the central axis.

4. The actuator according to claim 2, wherein
    regardless of a swing angle of the swing portion, an upper end of the magnetic structure opposes a lower surface of the swing portion in the central axis direction.

5. The actuator according to claim 2, wherein
    an upper end of the magnetic structure is below an upper end of the stator core.

6. The actuator according to claim 2, wherein
    a wiring substrate is between the non-magnetic structure and the swing portion in the central axis direction;
    the magnetic structure protrudes upward from an upper surface of the wiring substrate; and
    the detection coil is a wiring pattern provided on the wiring substrate.

7. The actuator according to claim 1, wherein
    the detection coil includes a winding surrounding an outer peripheral surface of the magnetic structure.

8. The actuator according to claim 7, wherein
    a length of the detection coil in the axial direction is shorter than a length of the magnetic structure; and
    two ends of the detection coil are in a range sandwiched between both ends of the magnetic structure in the axial direction.

9. The actuator according to claim 1, wherein
    the detection coils of the first angle detection element and the second angle detection element are windings surrounding an outer peripheral surface of the magnetic structure; and
    the actuator includes:
    an inductance processor connected to the detection coil to acquire an inductance of the detection coil while causing a current to flow through the detection coil, and acquire a swing angle of the swing portion based on a variation in the inductance.

10. The actuator according to claim 9, wherein
    the magnetic structures of the pair of first angle detection elements extend along the first axis, and the magnetic structures of the pair of second angle detection elements extend along the second axis; and
    when viewed from the central axis direction, each of the pair of first angle detection elements is positioned with a gap from the magnet in the second axis direction with the magnet interposed therebetween, and each of the pair of second angle detection elements is positioned with a gap from the magnet in the first axis direction with the magnet interposed therebetween.

11. The actuator according to claim 1, wherein
    the swing portion is made of metal, and includes a flat plate portion including a reflecting surface at an upper end thereof.

12. An actuator comprising:
a swing portion that is electrically conductive;
a frame portion to support the swing portion such that the swing portion is swingable about a first axis orthogonal to a central axis extending vertically;
a support portion to support the frame portion such that the frame portion is swingable about a second axis orthogonal to the first axis and intersecting the central axis;
a magnet below the swing portion;
a drive assembly including a drive coil defined by a lead wire wound around a stator core in the support portion and extending in the central axis direction;
a non-magnetic structure between the swing portion and the drive coil in the central axis direction; and
an angle detector to detect a swing angle of the swing portion; wherein
the angle detector includes a pair of first angle detection elements extending in the second axis direction with the first axis interposed therebetween and a pair of second angle detection elements extending in the first axis direction with the second axis interposed therebetween when viewed from the central axis direction, and the angle detector is above the non-magnetic structure;
each of the first angle detection elements and each of the second angle detection elements include:
  a columnar magnetic structure between the swing portion and the non-magnetic structure in the central axis direction; and
  a detection coil extending along an outer periphery of the magnetic structure;
the magnetic structure extends upward along the central axis direction;
each of the first angle detection element and the second angle detection element includes a capacitor connected in parallel to the detection coil;
the actuator further includes:
  a frequency processor connected to the detection coil to acquire a resonance frequency of a resonance circuit including the detection coil and the capacitor while causing a current to flow through the detection coil, and acquire a swing angle of the swing portion based on a fluctuation of the resonance frequency;
a wiring substrate is between the non-magnetic structure and the swing portion in the central axis direction;
the magnetic structure protrudes upward from an upper surface of the wiring substrate; and
the detection coil is a wiring pattern provided on the wiring substrate.

13. The actuator according to claim 12, wherein
an upper end of the magnetic structure in the central axis direction includes a flat surface intersecting the central axis.

14. The actuator according to claim 12, wherein
regardless of a swing angle of the swing portion, an upper end of the magnetic structure opposes a lower surface of the swing portion in the central axis direction.

15. The actuator according to claim 12, wherein
an upper end of the magnetic structure is below an upper end of the stator core.

16. The actuator according to claim 12, wherein the detection coil includes a winding surrounding an outer peripheral surface of the magnetic structure.

17. The actuator according to claim 16, wherein
a length of the detection coil in the axial direction is shorter than a length of the magnetic structure; and
two ends of the detection coil are in a range sandwiched between both ends of the magnetic structure in the axial direction.

18. The actuator according to claim 12, wherein
the detection coils of the first angle detection element and the second angle detection element are windings surrounding an outer peripheral surface of the magnetic structure; and
the actuator includes:
an inductance processor connected to the detection coil to acquire an inductance of the detection coil while causing a current to flow through the detection coil, and acquire a swing angle of the swing portion based on a variation in the inductance.

19. The actuator according to claim 18, wherein
the magnetic structures of the pair of first angle detection elements extend along the first axis, and the magnetic structures of the pair of second angle detection elements extend along the second axis; and
when viewed from the central axis direction, each of the pair of first angle detection elements is positioned with a gap from the magnet in the second axis direction with the magnet interposed therebetween, and each of the pair of second angle detection elements is positioned with a gap from the magnet in the first axis direction with the magnet interposed therebetween.

20. The actuator according to claim 12, wherein
the swing portion is made of metal, and includes a flat plate portion including a reflecting surface at an upper end thereof.

* * * * *